United States Patent
Zeiler et al.

(10) Patent No.: US 11,712,001 B2
(45) Date of Patent: Aug. 1, 2023

(54) ELECTRIC MOTOR FOR OUTDOOR POWER EQUIPMENT

(71) Applicant: Briggs & Stratton, LLC, Wauwatosa, WI (US)

(72) Inventors: Jeffrey M. Zeiler, Brookfield, WI (US); Scott A. Funke, Wauwatosa, WI (US); Mark Noller, Wauwatosa, WI (US); Nick Joseph Zeidler, Wauwatosa, WI (US); Christopher Krajewski, West Allis, WI (US); Joshua Kowalski, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 319 days.

(21) Appl. No.: 17/067,375

(22) Filed: Oct. 9, 2020

(65) Prior Publication Data

US 2021/0105939 A1    Apr. 15, 2021

Related U.S. Application Data

(60) Provisional application No. 62/914,148, filed on Oct. 11, 2019, provisional application No. 63/011,107, filed on Apr. 16, 2020.

(51) Int. Cl.
*A01D 34/78* (2006.01)
*A01D 34/81* (2006.01)
*A01D 34/82* (2006.01)
*A01D 101/00* (2006.01)

(52) U.S. Cl.
CPC ............. *A01D 34/78* (2013.01); *A01D 34/81* (2013.01); *A01D 34/82* (2013.01); *A01D 2101/00* (2013.01)

(58) Field of Classification Search
CPC .... A01D 34/78; A01D 2101/00; A01D 34/81; A01D 34/82
USPC ........................................................... 56/17.5
See application file for complete search history.

(56) References Cited

U.S. PATENT DOCUMENTS

| | | | |
|---|---|---|---|
| 5,615,540 A | * | 4/1997 | Yang ...................... A01D 69/02 56/11.9 |
| 6,688,090 B2 | | 2/2004 | Velke et al. |
| 8,240,414 B2 | | 8/2012 | Sasahara et al. |
| 8,657,041 B2 | | 2/2014 | Ishii et al. |
| 8,668,043 B2 | | 3/2014 | Yang et al. |

(Continued)

FOREIGN PATENT DOCUMENTS

| | | | |
|---|---|---|---|
| JP | 2020124081 A | * | 8/2020 |
| WO | WO-2017/109319 | | 6/2017 |
| WO | WO-2017/222368 | | 12/2017 |

*Primary Examiner* — Mahmoud Gimie
(74) *Attorney, Agent, or Firm* — Foley & Lardner LLP

(57) ABSTRACT

A lawn mower includes a chassis, a cutting deck, a chore motor, and a blade. The chassis supports several wheels. The cutting deck is supported by the chassis and defines a cutting chamber. The chore motor is electrically coupled to the battery. The chore motor includes a housing containing a coil assembly, a rotor, and a drive shaft extending out of the housing. The chore motor is attached to the cutting deck so that at least a portion of the housing and the drive shaft are positioned within the cutting chamber. The blade is coupled to the drive shaft and is configured to rotate within the cutting chamber when the chore motor rotates the rotor and drive shaft.

20 Claims, 26 Drawing Sheets

(56) References Cited

U.S. PATENT DOCUMENTS

| | | |
|---|---|---|
| 8,966,870 B2 | 3/2015 | Mackinnon et al. |
| 9,210,839 B2 | 12/2015 | Schygge et al. |
| 9,282,695 B2 | 3/2016 | Goto |
| 9,380,741 B2 | 7/2016 | Drew et al. |
| 9,840,143 B1 | 12/2017 | Keller et al. |
| 9,950,621 B2 | 4/2018 | Dwyer |
| 9,980,434 B1 | 5/2018 | Brown |
| 10,091,936 B2 | 10/2018 | Laurin et al. |
| 10,093,169 B1 | 10/2018 | Keller et al. |
| 10,292,326 B2 | 5/2019 | Tanabe et al. |
| 11,462,967 B2 * | 10/2022 | Kouda .................. H02K 7/003 |
| 2005/0005588 A1 * | 1/2005 | Jager .................... H02K 9/227 |
| | | 56/15.7 |
| 2005/0230168 A1 | 10/2005 | Fillman et al. |
| 2012/0260617 A1 | 10/2012 | Gilpatrick |
| 2014/0165524 A1 | 6/2014 | Schygge et al. |
| 2015/0006025 A1 | 1/2015 | Rhoades et al. |
| 2016/0183451 A1 | 6/2016 | Conrad et al. |
| 2018/0192580 A1 | 7/2018 | Zeiler et al. |
| 2018/0235149 A1 | 8/2018 | Ito et al. |
| 2018/0249630 A1 | 9/2018 | Mullet et al. |
| 2018/0310471 A1 | 11/2018 | Pellenc |
| 2020/0112227 A1 * | 4/2020 | Kouda .................. H02K 5/161 |

\* cited by examiner

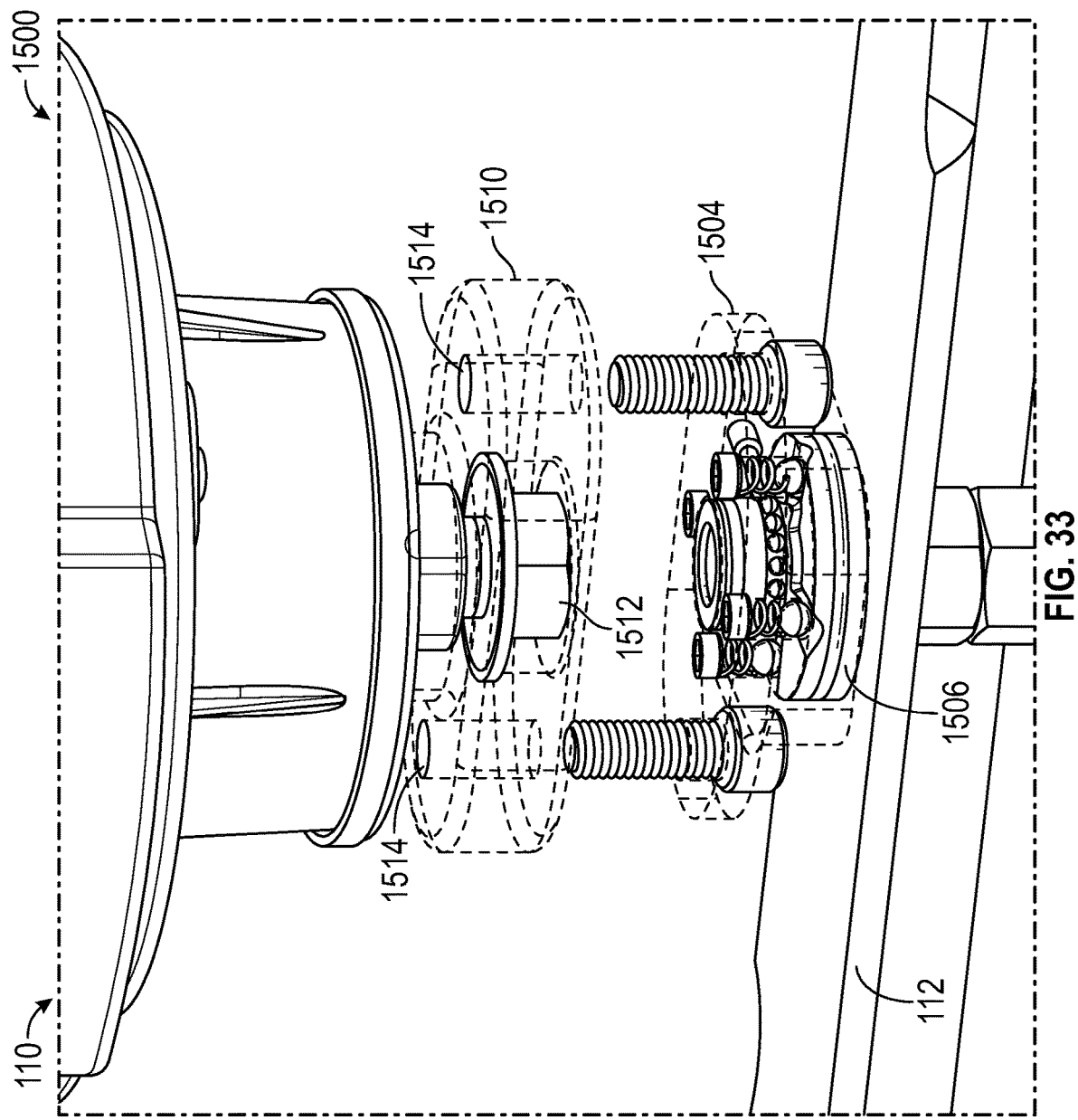

ELECTRIC MOTOR FOR OUTDOOR POWER EQUIPMENT

CROSS-REFERENCE TO RELATED PATENT APPLICATIONS

This application claims priority to U.S. Provisional Patent Application No. 62/914,148, filed Oct. 11, 2019, and to U.S. Provisional Patent Application No. 63/011,107, filed Apr. 16, 2020, the contents of which are hereby incorporated by reference in their entireties.

BACKGROUND

The present application relates generally to outdoor power equipment. More specifically, the present application relates to electric motors that may be used in outdoor power equipment such as zero-turn radius mowers, walk-behind mowers, riding mowers, spreader/sprayers, snow throwers, and other battery-powered lawn equipment.

SUMMARY

One exemplary embodiment relates to a lawn mower. The lawn mower includes a chassis, a cutting deck, a chore motor, and a blade. The chassis supports several wheels. The cutting deck is supported by the chassis and defines a cutting chamber. The chore motor is electrically coupled to the battery. The chore motor includes a housing containing a coil assembly, a rotor, and a drive shaft extending out of the housing. The chore motor is attached to the cutting deck so that at least a portion of the housing and the drive shaft are positioned within the cutting chamber. The blade is coupled to the drive shaft and is configured to rotate within the cutting chamber when the chore motor rotates the rotor and drive shaft.

Another exemplary embodiment relates to a lawn mower. The lawn mower includes a chassis, a cutting deck, a chore motor, and a blade. The chassis supports several wheels. The cutting deck is supported by the chassis and defines a cutting chamber. The chore motor is electrically coupled to the battery. The chore motor includes a housing containing a coil assembly, a rotor, and a drive shaft extending out of the housing. The chore motor is attached to the cutting deck so that at least a portion of the drive shaft is positioned within the cutting chamber. The blade is coupled to the drive shaft and is configured to rotate within the cutting chamber when the chore motor rotates the rotor and the drive shaft. Relative rotation between the blade and the drive shaft occurs in response to a torque on the blade exceeding a threshold value.

Another exemplary embodiment relates to a lawn mower. The lawn mower includes a chassis, a cutting deck, a chore motor, and a blade. The chassis supports several wheels. The cutting deck is supported by the chassis and defines a cutting chamber. The chore motor is electrically coupled to the battery. The chore motor includes a housing containing a coil assembly, a rotor, and a drive shaft extending out of the housing. The chore motor is attached to the cutting deck so that at least a portion of the drive shaft is positioned within the cutting chamber. The blade is coupled to the drive shaft and is configured to rotate within the cutting chamber when the chore motor rotates the rotor and the drive shaft. Relative rotation between the blade and the drive shaft occurs in response to an axial force on the blade exceeding a threshold value.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description when taken in conjunction with the accompanying figures.

FIG. 33 is a partially exploded view of the spindle assembly of FIG. 32.

DETAILED DESCRIPTION

Figure 1:
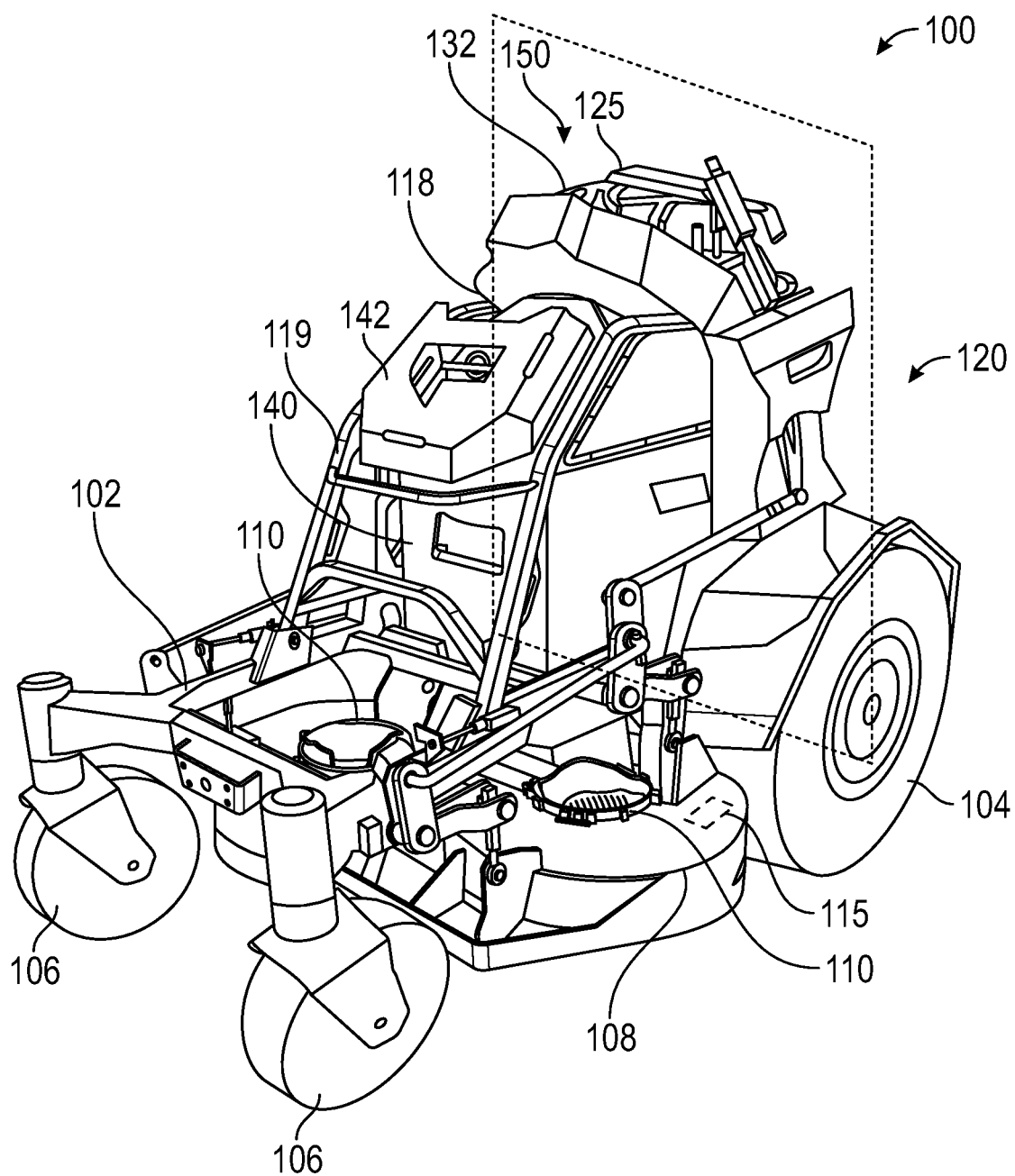
FIG. 1 is a front perspective view of an electric stand-on mower, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Although the description and figures herein describe the structure and operation of a stand-on electric mower, it should be understood that the components described herein could be utilized with other types of outdoor power equipment such as riding tractors, snow throwers, pressure washers, tillers, log splitters, zero-turn radius mowers, walk-behind mowers, riding mowers, pavement surface preparation devices, industrial vehicles such as forklifts, utility vehicles, commercial turf equipment such as blowers, vacuums, debris loaders, overseeders, power rakes, aerators, sod cutters, brush mowers, sprayers, spreaders, etc. The components described herein can also be utilized with a light electric vehicle, including passenger and utility electric vehicles.

Referring to the figures generally, the various exemplary embodiments disclosed herein relate to electric motors that can be included within an electric lawn mower. The electric motors can be configured as "chore motors" that are used to drive rotary components (e.g., one or more blades, an auger on a snow thrower, etc.) on the piece of outdoor power equipment. The chore motors are coupled to a main electrical energy source, such as a battery or generator, and are controlled by a motor controller. The motor controller and other motor controls can be positioned remotely from the chore motor, which can allow for a more compact, low profile housing and overall motor design. The low-profile chore motors are positioned on or below a deck of the mower (e.g., "sub-flush" relative to the top surface of the deck) or other piece of outdoor power equipment, which can promote improved airflow and cooling through the motor.

The motor controller is configured to operate the one or more chore motors on the piece of outdoor power equipment in both a forward (e.g., clockwise) and reverse (e.g., counter-clockwise) direction, which can help to direct process material (e.g., grass clippings, snow, etc.) that is being displaced by the rotary components of the outdoor power equipment. For example, the direction that the chore motor is being operated may allow a lawn mower to discharge clippings and other debris from the mower to the side of the mower, rather than behind the mower. Multiple chore motors can be operated in different (e.g., opposite) directions, which can also direct the process material away from nearby rotary components. In a lawn mower, for example, operating the two or more chore motors in opposite directions can help prevent the grass clippings from being processed twice, as the motors will be configured to direct clippings away from adjacent blades. The motor controller can communicate with other electrical motors as well, including motors that are configured to adjust a discharge chute or opening. The motor controller may adjust the direction of the discharge based on the direction the mower is traveling (e.g., straight, turning left, turning right, etc.), the position of the drive wheels (e.g., forward or reverse rotation) of the mower, or other control logic.

The chore motors include torque limiting or axial load-limiting features that help the chore motors withstand and combat impact loading that may occur during operation of the outdoor power equipment. The chore motors can be provided selective couplings or clutch mechanisms that can temporarily decouple and/or disengage the drive shaft of the chore motor from the rotor when impact loading is experienced. For example, if the blade contacts a rock or a stump, the motor (through the blade) may experience significant torque loading that might fracture or shear the drive shaft in conventional motors. The chore motors disclosed in the present application include mechanical couplings that can allow the drive shaft to decouple from rotor of the chore motor. With the drive shaft decoupled from the rotor, the torque loading on the drive shaft will drop, which can prevent or significantly reduce the likelihood of failure. In some examples, the drive shaft and rotor are further configured to decouple from one another in response to axial loading in addition to or instead of torque loading.

Referring now to FIG. 1, a piece of outdoor power equipment is depicted. The piece of power equipment can be a stand-on electric lawn mower 100, for example. The mower 100 includes a frame, shown as chassis 102, which supports rear drive wheels 104 and front wheels 106. The rear drive wheels 104 can be powered by one or more electric drive motors (not shown). The chassis 102 further supports a cutting deck 108 which is positioned between the rear drive wheels 104 and the front wheels 106. The chassis 102 supports an energy storage device 140 (e.g., a battery) positioned near the center of the mower 100. The energy storage device 140 provides electrical power to each of the drive motor and the additional motors (e.g., chore motors 110) and subsystems positioned on the mower 100. An operator area 120 is partially defined by and positioned rearward of the chassis 102.

The cutting deck 108 is suspended from or otherwise supported by the chassis 102, and extends between the rear drive wheels 104 and the front wheels 106. The cutting deck 108 supports one or more chore motors 110 that drive blades 112. Rotary motion of the blades 112 cuts grass contacted by the blade 112 and displaces the cut grass outward from below the cutting deck 108.

The chore motors 110 and/or drive motor communicate with a motor controller 115. The motor controller 115 can be positioned within a controller housing 118. The controller housing 118 can receive and surround one or more drive motor controllers, chore motor controllers 115 and/or other circuits that control different systems on the mower 100. The controller housing 118 can extend at an angle and can be supported by a tubular frame 119 extending away from the chassis 102. In some examples, the controller housing 118 is formed behind a shield 142 that extends over the energy storage device 140. The angled orientation of the controller housing 118 and the gap between the shield 142 creates a pathway for cooling air to travel over the controller housing 118 to provide convective cooling for the controllers received within the controller housing 118.

The shield 142 provides both physical and thermal protection for the energy storage device 140 and other electronics on the mower 100. As explained above, the angled orientation of the shield 142 allows air to flow through and along both the energy storage device 140 and controller housing 118 to provide cooling. The shield 142 also protects the energy storage device 140 and controller housing 118 from contact with branches or other objects that may hit the mower 100. The protection provided by the shield 142 helps the energy storage device 140 to support connections with and provide electrical energy to various systems on the mower. In some examples, the energy storage device 140 provides electrical energy to the drive motors, the chore motors 110, the chore motor controller 115, a traction motor controller, a dashboard 150 (e.g., a user interface, indicators, etc.), a control system, and other mower accessories. The energy storage device 140 can include additional liquid cooling (e.g., water) systems to further combat the thermal energy generated by the mower 100. The energy storage device 140 can include a battery management system to control and monitor the operation of the energy storage device 140.

As previously discussed, the energy storage device 140 can be a battery or battery module and can include one or more distinct batteries including one or more battery cells. For example, the energy storage device 140 can be one or more lithium-ion (Li-ion) batteries, a lithium-ion Polymer (LiPo) batteries, lead-acid batteries, a nickel-cadmium (NiCd) batteries, nickel-metal hydride (NiMh) batteries and/or any other type of battery configured to store and/or discharge energy. In some examples, the energy storage device 140 has a capacity of 10 kWh. Different energy capacities of the energy storage device 140 can also be used, including 0.1 kWh, 0.5 kWh, 1 kWh, 3 kWh, 5 kWh, 50 kWh, etc. Some (in the case of multiple battery packs, etc.) or all of the energy storage devices 140 may be removable. The energy storage device 140 may also be a capacitor, ultracapacitor, a bank of capacitors, or an electrical generator (including a liquid or gaseous fuel storage device, engine, alternator, and rectifier), etc.

The mower 100 can be driven and steered using a steering assembly that is in communication with the drive controller and/or driver motor. For example, the mower 100 includes drive levers 125 (e.g., right drive lever, left drive lever) movable by the operator to change the speed of the mower 100 in a forward and backward direction and to change direction of the mower 100 in forward, backward, right, and left directions. The mower 100 also includes one or more handles 132 designed to be grasped by an operator standing on a platform of the mower 100. The handles 132 run parallel to the drive levers 125, positioned forward and rearward of the drive levers 125 and act as reference points to which the drive levers 125 may be moved forward and backward, thereby mechanically limiting the top speeds in the forward and backward direction of the mower 100.

Figure 2:
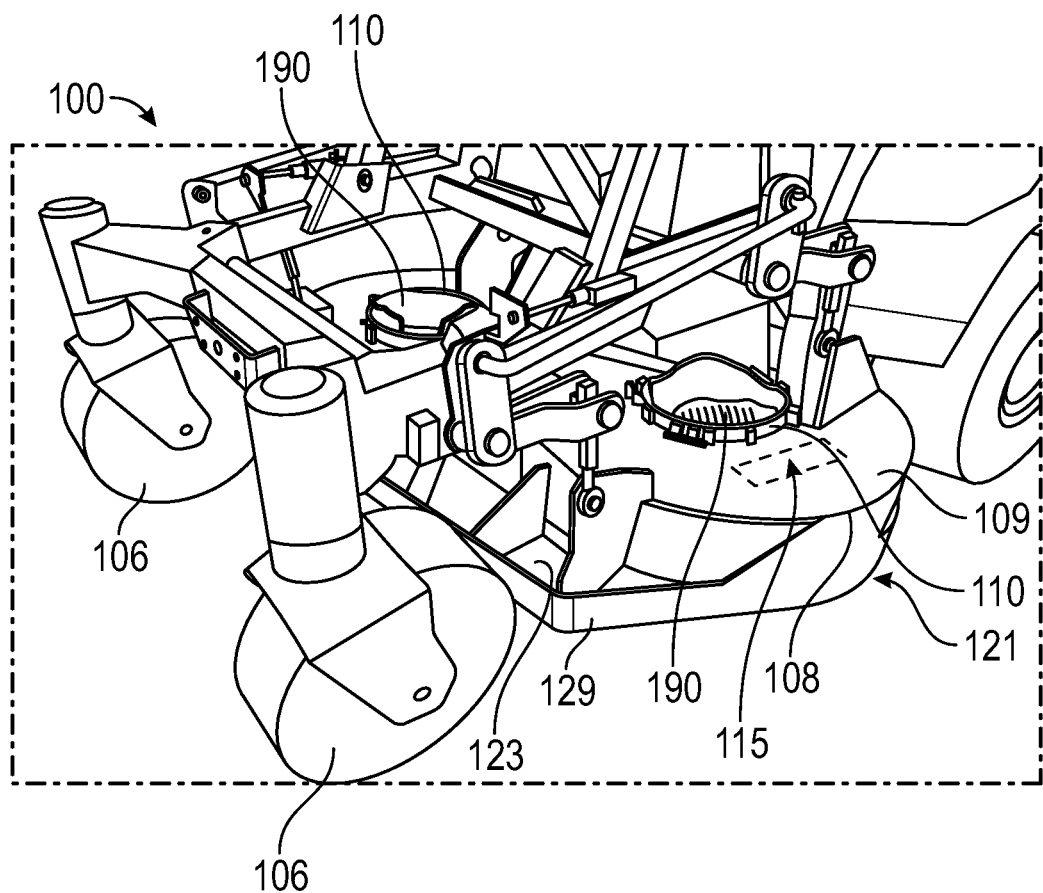
FIG. 2 is a perspective view of a deck of the electric stand-on mower of FIG. 1.
Figure 3:
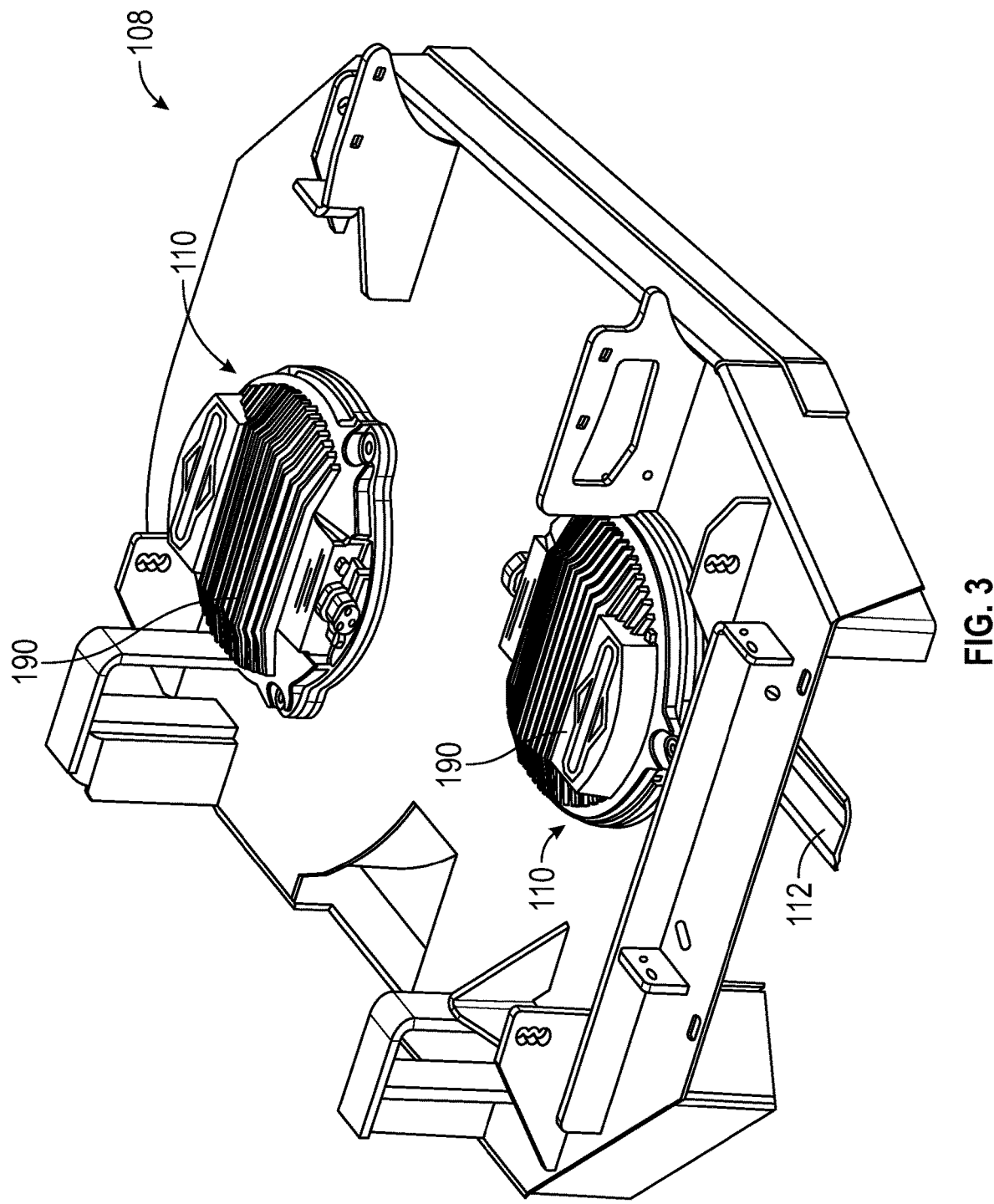
FIG. 3 is a top perspective view of the deck of FIG. 2, shown isolated from the electric stand-on mower of FIG. 1.
Figure 4:
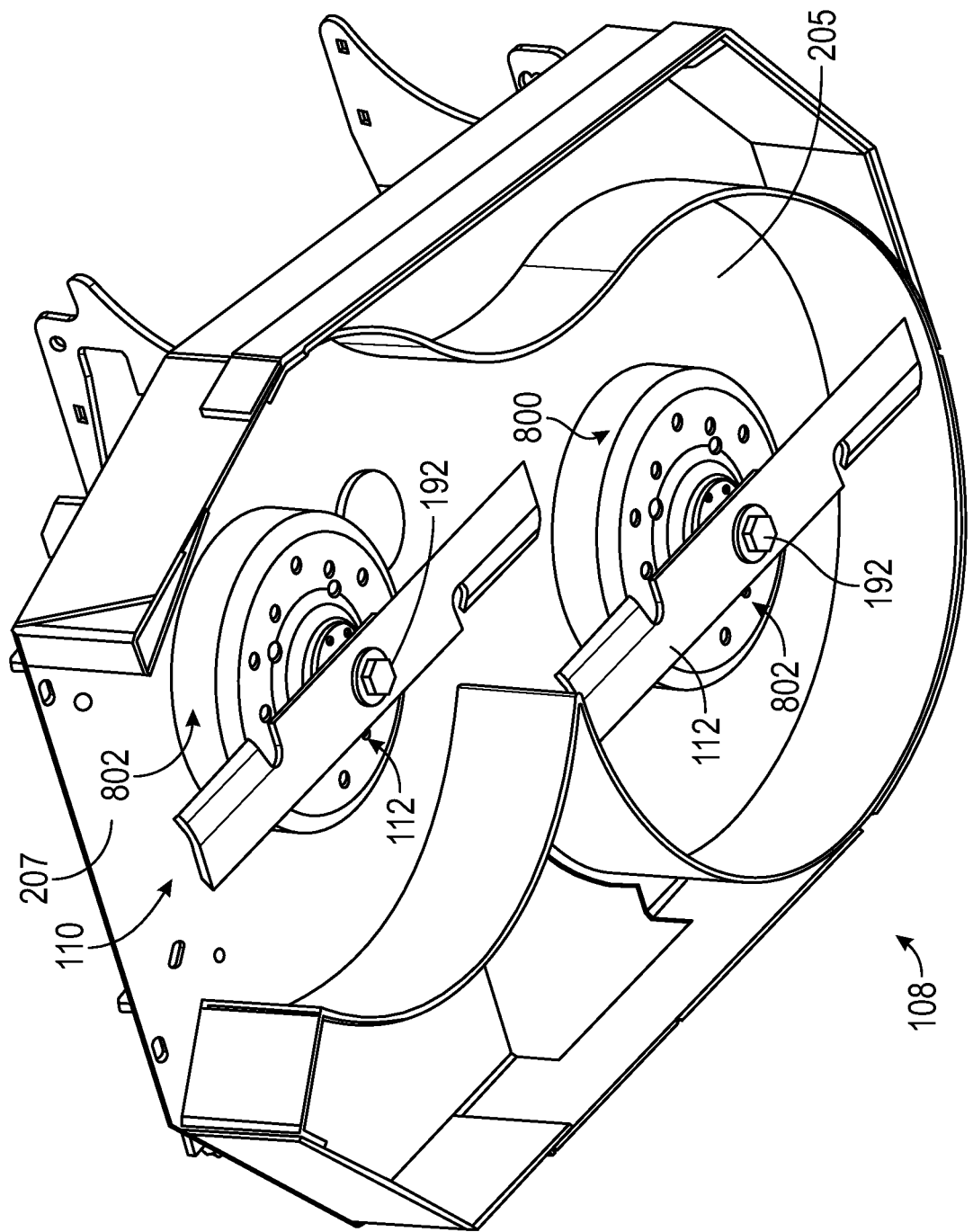
FIG. 4 is a bottom perspective view of the deck of FIG. 3.

With additional reference to FIGS. 2-4, the cutting deck 108 is shown in further detail. The cutting deck 108 includes a housing portion 121 and a frame portion 129 extending from the housing portion 121 toward the front of the mower 100. The frame portion 129 includes one or more openings 123 formed between the housing portion 121 of the cutting deck 108 and the front wheels 106. From the operator area 120, the operator can view the ground immediately in front of the cutting deck 108 (e.g., through the openings 123 formed in the cutting deck 108). The cutting deck 108 includes a motor controller 115 and chore motors 110. The chore motors 110 extend below the cutting deck 108, where the chore motors 110 may be coupled to a rotary tool, such as cutting blades 112, via shaft assemblies. Each shaft assembly may include a shaft that is fixedly coupled to the output shaft at a first end and selectively coupled to a cutting blade 112 at a second end. Bearings surround the shaft and prevent the shaft from moving radially. A cutting blade 112 is selectively coupled to an output shaft of one of the chore motors 110. For example, a hole can be formed within the cutting blade 112 to receive a fastener (e.g., a bolt 192) to secure the blade 112 to a shaft assembly of the chore motor 110. As explained in additional detail below, the shaft assembly may include a quick release mechanism that selectively couples the cutting blade to the output shaft to connect the cutting blade to the chore motor 110. In other embodiments, the output shaft may detachably couple to the cutting blade (e.g., under high loads, impact forces).

The chore motors 110 are electrically coupled to chore motor controller 115 positioned proximate the cutting deck 108. In some embodiments, the motor controller 115 can be located on the deck 108 of the mower 100. The chore motor 110 including the rotor and stator assemblies are positioned entirely below (e.g., sub-flush to) the cutting deck 108 (e.g., beneath the top surface 109 of the cutting deck 108), while the motor cover 190 is positioned at least partially above the deck 108. In some embodiments, all electronics included within chore motors 110 are positioned beneath the deck 108 (e.g., beneath the top surface 109 of the deck 108).

The chore motors 110 are electrically coupled to the chore motor controller 115, which is positioned proximate the cutting deck 108. In some embodiments, the motor controller 115 can be located on the deck 108 of the mower 100. In some examples, motor controllers 115 can be positioned within (e.g., integrated in a single housing with) each of the chore motors 110 in the cutting deck 108. In some embodiments, the motor controller 115 is in contact with a top surface (e.g., a top wall) of the cutting deck 108. In other embodiments, the motor controller 115 is exposed to a cutting chamber (e.g., cutting chamber 420, shown in FIG. 11) inside the housing of the cutting assembly 600 (shown in FIG. 13). The motor controller 115 and its associated housing can include cooling fins that are exposed to air being ventilated through a cutting chamber of cutting deck 108. The motor controller 115 may be sub-flush the cutting deck 108. For example, the motor controller 115 (e.g., the housing of the motor controller 115) is positioned at least partially below (or sub-flush relative to) the top surface 109 of the cutting deck 108. In contemplated embodiments, the motor controller 115 is proximate a side of a chore motor 110 and/or coupled to an edge of the chore motor 110. The motor controller 115 may be positioned relative to a chore motor 110 (e.g., above, to the side of, etc.) to improve thermal management for the motor controller 115. In some embodiments, the motor controller 115 is positioned underneath the cutting deck 108 separate from the chore motors 110. In some embodiments, one or more motor controllers 115 may be housed within a single controller module. The airflow under the cutting deck 108 may help prevent the motor controller 115 from overheating, as well as the chore motors 110 sub-flush the cutting deck 108. For example, the airflow generated by the rotating blades 112 can be used to help cool the motor controller 115 and the chore motors 110.

The motor controller 115 controls the chore motor(s) 110, and can be configured to select direction of rotation (e.g., forwards and backwards) of the chore motors 110, control and regulate speeds based on the size of the deck 108 and blades, determine a direction to bias a deflector of a cutting assembly, and other features. In some embodiments, the motor controller 115 can also be configured to operate the chore motors 110 in a backwards direction (e.g., reverse mode, counter-clockwise or clockwise) to unwind debris. For example, the motor controller 115 may detect an increase in power consumption and/or detect a problem regulating the speed of rotation of the chore motors 110. The motor controller 115 can then control the chore motors 110 to run in a reverse mode, at a slower speed (e.g., half the revolutions per minute (RPM) as in the forward direction), to unwind debris from blades coupled to the chore motors 110. For example, if a piece of wire, rope, etc. is wound up in one of the blades of mower 100 or if cut grass is wedged between the tip of the blades and the cutting deck housing 212, 214, an operator may use the reverse operation of the chore motors 110 to remove the debris clogging the cutting deck 108.

The motor controller 115 can control additional components beyond the chore motors 110. For example, the motor controller 115 can also control the one or more drive motors of the mower 100. In some embodiments, the motor controller 115 is configured to operate motors (e.g., chore motors 110) in a backwards direction during a reverse mode to raise the cutting deck 108. The motor controller 115 can be configured to operate one or more motors coupled to a deck lift mechanism. These lift motors (not shown) may be operated in a first, forward direction or a second, reverse direction. The forward and reverse directions of the lift motors may then correspond to either lowering or raising the cutting deck 108. In some embodiments, the motor controller 115 may be configured to automatically operate the lift motors in the direction programmed to raise the deck (e.g., a reverse direction or a forward direction) in response to the drive wheels of the mower 100 operating in a reverse direction and the cutting blades not operating (i.e., the chore motors 110 are off). For example, when backing the mower 100 over a curb, the motor controller 115 may be configured to operate the lift motors to raise the cutting deck 108 to a predetermined height for clearing the curb. Raising the height of the cutting deck 108 during transport may also improve ground clearance for additional objects, such as tree roots, trailer ramps, and/or chargers mounted to a trailer platform.

In some embodiments, the motor controller 115 receives input from a user interface of the dashboard 150 to operate the chore motors 110 in a desired direction. For example, an operator of the mower 100 may flip a switch between a normal mode of operating the motors 110 and a reverse mode to run the chore motors 110 in a backwards direction. In some embodiments, the motor controller 115 operates the chore motors 110 in a reverse direction to cause the rotatory tool (e.g., blades) coupled to output shafts of the chore motors 110 to decouple. Accordingly, the blades of the mower 100 may be decoupled (e.g., drop) from the chore motors 110 easily and safely when an operator desires to remove and/or interchange blades.

Additionally, the motor controller 115 can be configured to control a motor that adjusts a bias of a grass clipping deflector plate of the cutting deck 108. For example, the motor controller 115 may receive an input from a user interface of the dashboard 150 of a desired direction to deflect the clippings of the mower 100. In some embodiments, an operator of the mower 100 may desire the clippings to be evenly fanned out behind the mower 100. In other embodiments, an operator of the mower 100 may desire that the clippings be discharged in a biased direction, such as to the left or right side of the mower 100. An operator may desire grass clippings to be fanned out in one direction when near a specific area of a lawn (e.g., a flowerbed, a mulch bed, a sidewalk next to the lawn, etc.), for example. By biasing the discharge from the mower 100 in a specific direction, an operator may prevent clippings from being discharged in the specific area. In some embodiments, the mower 100 may be operated in two or more different modes, and a user may toggle between the modes via a user interface (e.g., a button, a switch, a lever, etc.) of the dashboard 150. In some embodiments, one mode has the motor controller 115 instructing a motor to orient the deflection plate of a cutting assembly (e.g., cutting assembly 600, shown in FIG. 13) to disperse clippings in a widely spread, even manner behind the mower 100. In some embodiments, a second mode has the motor controller 115 instructing a motor to orient the deflection plate of a cutting assembly to fan out the clippings in a narrower, more specific direction.

The motor controller 115 can also be configured to instruct a motor (e.g., a chore motor 110 or otherwise) to control the angle of a clipping deflection plate based on the direction of the drive wheel motors. For example, the motor controller 115 may instruct a motor to orient a deflection plate to discharge clippings towards a center of the direction the mower 100 is traveling. In other embodiments, the mower 100 includes a plastic nozzle for a cutting assembly that is coupled to a motor. The motor controller 115 can be configured to instruct a motor to orient the plastic nozzle in various directions to discharge clippings in a preferred direction. By automatically biasing the deflection of clippings from the mower 100, the amount of time an operator needs to clean a site after using the mower 100 may be reduced. In some embodiments, the motor controller 115 is configured to automatically rotate a discharge opening (e.g., left discharge opening 711, shown in FIG. 14) of a pod of a cutting deck assembly based on mower operational parameters. Mower operational parameters may include parameters such as a drive lever position on the mower 100, differential velocity of drive wheels of the mower 100, and/or other operational parameters (e.g., GPS information, accelerometer information, etc.) that may be used to determine whether the mower 100 is moving.

The motor controller 115 may also include a communications port. The communications port can be configured to communicate with other motor controllers (e.g., via bus connections like a controller area network (CAN) bus), can include analog inputs, analog outputs, digital inputs, digital outputs, a motor position sensor connection, and/or other motor sensor inputs. Using a communications bus can reduce and/or minimize cabling. In some embodiments, the communications port includes two analog inputs, one analog output, digital input/output connections, CAN 2.0b connections, a motor position sensor input, and other motor sensor inputs.

Figure 5:
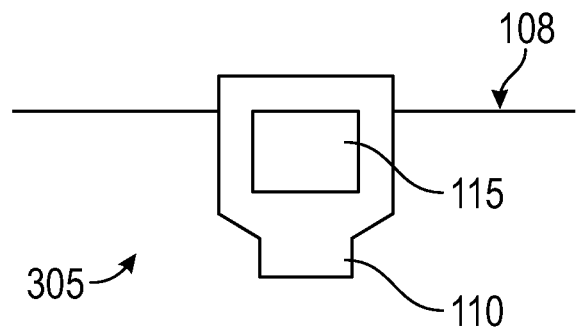
FIGS. 5-11 are schematic views of different possible positions of a motor controller and chore motor on the deck of the electric stand-on mower of FIG. 1.
Figure 6:
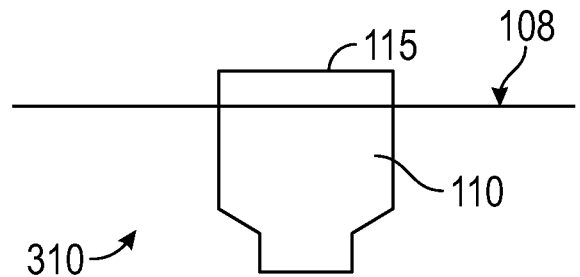
Figure 7:
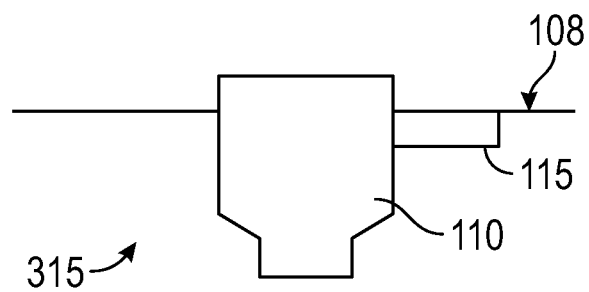
Figure 8:
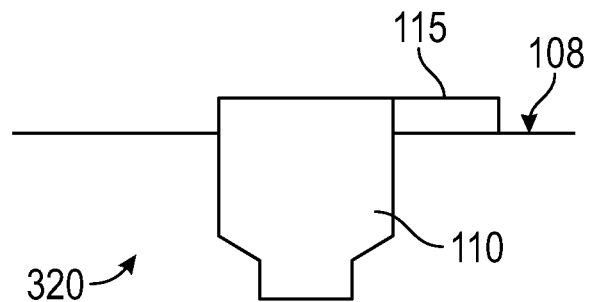
Figure 9:
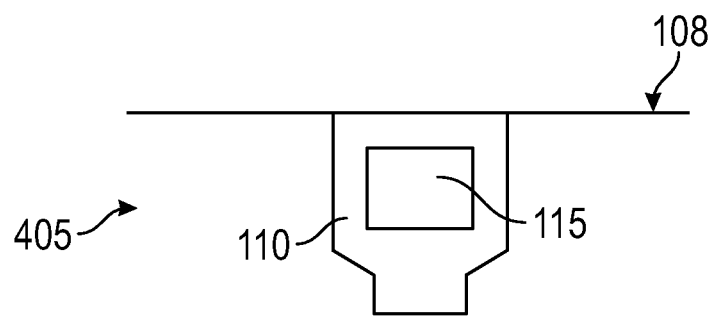
Figure 10:
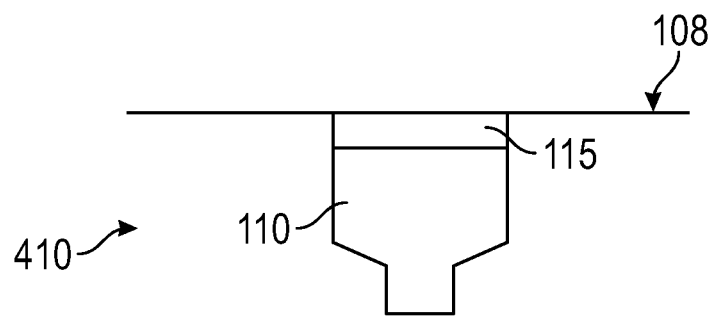
Figure 11:
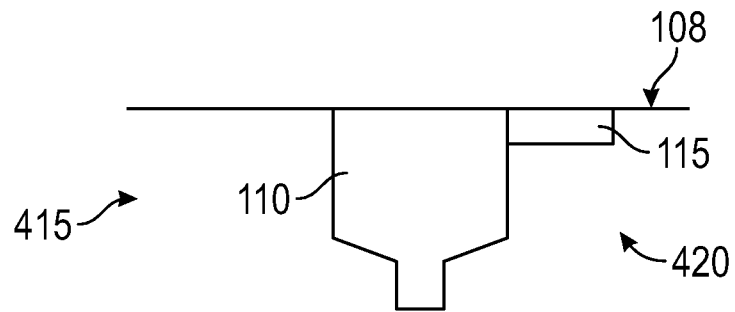

Referring now to FIGS. 5-12, several possible arrangements for the motor controller 115 relative to the cutting deck 108 are shown. As shown in FIG. 5, a position 305 includes the motor controller 115 within the same enclosure as the chore motor 110, both of which are substantially sub-flush relative to the top surface of the cutting deck 108. Alternatively and as shown in FIG. 6, the motor controller 115 can be placed in a position 310, where the motor controller 115 is located above the housing of the chore motor 110 and the chore motor 110 is substantially sub-flush relative to the top surface of the cutting deck 108. As shown in FIG. 7, the motor controller 115 can be secured in position 315, proximate (e.g., coupled to the right side) the housing of the chore motor 110 and sub-flush relative to the top surface of the cutting deck 108. FIG. 8 shows the motor controller in a position 320, with the motor controller 115 proximate the chore motor 110 and above the top surface of the cutting deck 108. The chore motor 110 is depicted sub-flush relative to the top surface of the cutting deck 108. FIGS. 9-11 show the motor controller 115 in positions 405, 410, and 415, where the chore motor 110 and the motor controller 115 are both located completely below the top surface of the cutting deck 108. Position 405 includes the chore motor 110 and the motor controller 115 contained within the same housing as the chore motor 110, below the top surface of the cutting deck 108. Position 410 includes the motor controller 115 located above the chore motor 110, both entirely below the top surface of the cutting deck 108. Position 415 includes the motor controller 115 positioned proximate (e.g., to the right of, off to the side of) the chore motor 110, with both the chore motor 110 and motor controller 115 entirely below (e.g., sub-flush relative to) the top surface of the cutting deck 108. In some embodiments, the motor controller 115 is exposed to a cutting chamber 420 of the cutting deck 108. With the motor controller 115 positioned within the cutting chamber 420, the motor controller 115 can be cooled with the airflow throughout the cutting chamber 420. In other embodiments, the motor controller 115 may be located elsewhere on the mower 100, such as near the operator area 120 shown in FIG. 1.

Figure 12:
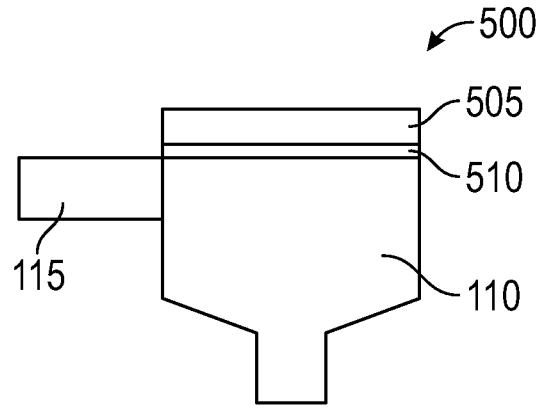
FIG. 12 is a schematic view of a blower coupled to a chore motor of the electric stand-on mower of FIG. 1.

Referring now to FIG. 12, a schematic of chore motor 110 coupled to a blower 505 with a clutch 510 is shown, according to some embodiments of the disclosure. A chore motor 110 is coupled to a blower 505. The blower 505 can be coupled to the chore motor 110 via a short rotating shaft (e.g., a stub shaft) and positioned above (e.g., on a top surface of the housing) of the chore motor 110. In some embodiments, the blower 505 may be connected to the chore motor 110 when the chore motor 110 is instructed by the motor controller 115 to run in a backwards direction from normal operation. The blower 505 may be connected to the chore motor 110 via clutch 510 (e.g., a one-way roller clutch). The clutch 510 may be a type of freewheel clutch, for example. In some embodiments, blades coupled to the chore motors 110 are also connected to the clutch 510 (e.g., a one-way roller clutch) in the same manner as the blower 505. However, the clutches for the blades may be configured to operate the blades at a different time than the blower 505. Accordingly, when the chore motor 110 operates in one direction (e.g., a forward direction), the blades are operating (e.g., rotating), and when the chore motor 110 operates in a second, opposite direction (e.g., a backwards/reverse direction), the blower 505 operates (e.g., turns on) and the blades do not operate. In some embodiments, the forward direction is in a clockwise direction and the reverse direction is in a counter-clockwise direction. In other embodiments, the forward direction is in a counter-clockwise direction and the reverse direction is in a clockwise direction, depending on the configuration of the motor controller 115. In some embodiments, the chore motors 110 operate in the first, forward direction during a standard cutting mode for the mower 100.

In some embodiments, the blower 505 is a fan that is positioned on the top surface 109 of the cutting deck 108 and is structured to clear debris off the deck of the mower 100. In some embodiments, a fan positioned proximate and/or on the cutting deck 108 also provides cooling for the chore motors 110 and/or motor controller 115. The motor controller 115 can be configured to monitor a temperature of the chore motor 110 and begin operation of the blower 505 in response to the temperature of the chore motor 110 rising above a predetermined threshold. For example, if the chore motor 110 is approaching a temperature that may be harmful to the chore motor 110, the motor controller 115 may cause the blower 505 to turn on to help cool down the chore motor 110. A blower 505 coupled to the chore motor 110 may also be coupled (e.g., electrically, communicably) to an accessory mount 117. The blower 505 may also be powered by the energy storage device 140 (e.g., a battery pack).

Figure 13:
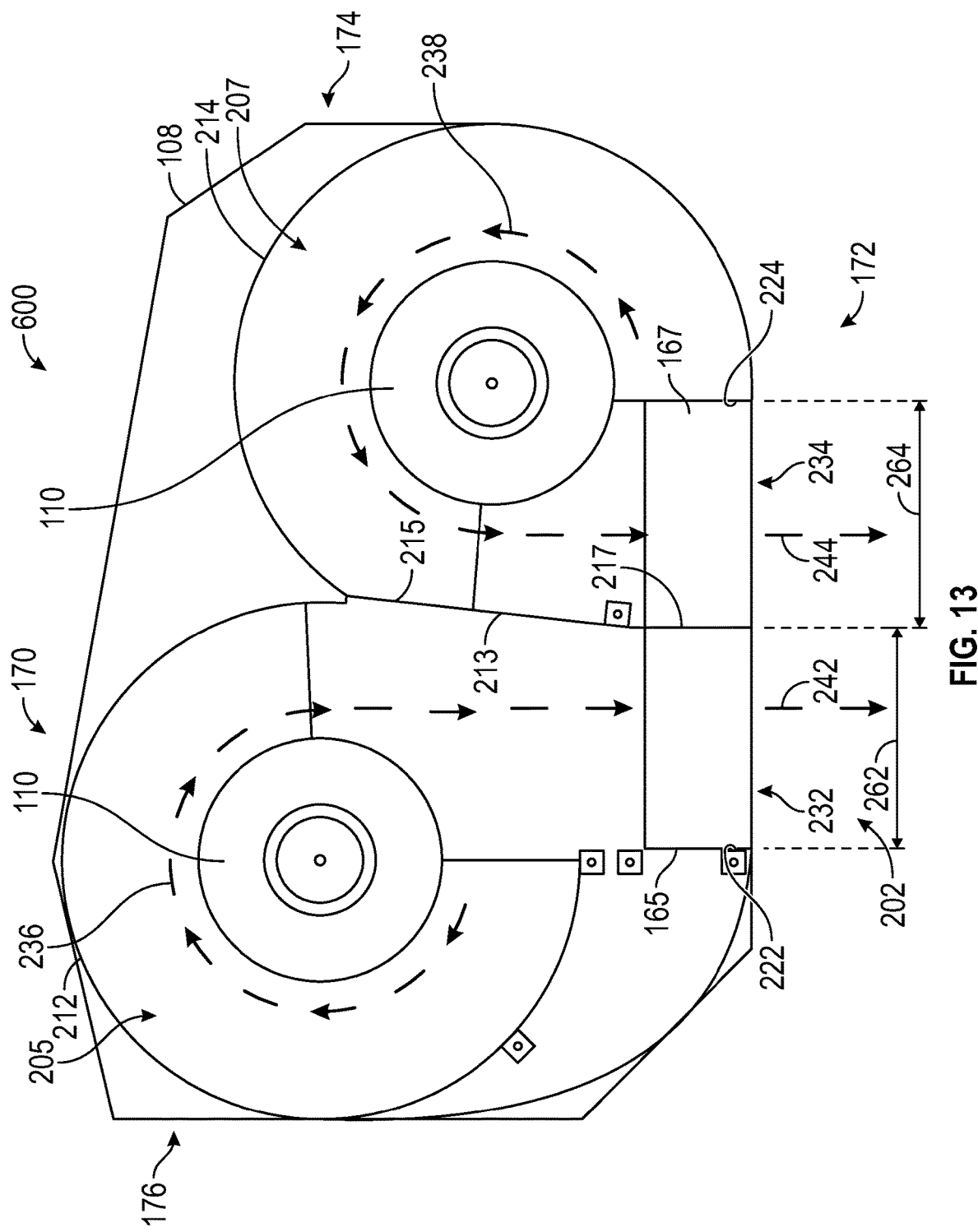
FIG. 13 is a bottom view of a deck that can be incorporated into the electric stand-on mower of FIG. 1, according to an exemplary embodiment.

Referring to FIG. 13, a cutting assembly 600 is shown, according to an exemplary embodiment. The view of the cutting assembly 600 is from an underside of the cutting deck 108. The cutting deck 108 includes a front side 170, rear side 172, left side 174, and right side 176. The cutting deck 108 supports one or more chore motors 110 that are positioned in and extending through the cutting deck 108. The chore motors 110 are each coupled with blades 112 and configured to supply rotational energy to the blade 112 that the chore motor 110 is coupled with. A right blade is coupled to the chore motor 110 on the right side 176 of the cutting deck 108, and a left blade is coupled to the chore motor 110 on the left side 174 of the cutting deck 108. The right blade may rotate in a clockwise motion when viewing the deck 108 from the underside 175. The left blade may rotate in a counter-clockwise motion when viewing the deck 108 from the underside 175. As such, each of the blades rotates inward toward the center of the deck 108 such that the right blade rotates in an opposite direction relative to the rotation of the left blade.

The cutting deck 108 includes a right housing 212, a left housing 214, and a rear discharge opening 202. The rear discharge opening 202 is defined between a right housing end wall 222 and a left housing end wall 224. The right housing 212 and left housing 214 are generally formed with a partial circular shape. The right housing 212 and the left housing 214 are shaped and sized to allow the blades to rotate therein, with a small clearance around the circumference of the housings 212, 214 between the blades and the inner surfaces of the housings 212, 214.

A baffle 215 forms a part of both the right housing 212 and the left housing 214. The baffle 215 extends within the cutting deck 108 from the rear discharge opening 202. A right blade cavity 205 is formed by the right housing 212 and the baffle 215 and a left blade cavity 207 is formed by the left housing 214 and the baffle 215. The right blade rotates within the right blade cavity 205 and the left blade rotates within the left blade cavity 207. The baffle 215 separates the right blade cavity 205 from the left blade cavity 207. The baffle 215 includes a lower wall portion 213 and a higher wall portion 217. The lower wall portion 213 is positioned to allow the left blade to pass over the lower wall portion 213. The baffle 215 may help to improve or increase the vacuum created by the rotation of blades within the right and left blade cavities 205, 207. The baffle 215 may help separate the airflow streams contained within the left blade cavity 207 and the right blade cavity 205, thereby improving the efficiency of the deck. In some embodiments, the baffle 215 is a continuous low wall, to the discharge opening 202, without a higher wall portion 217. In some embodiments, the higher wall portion 217 of baffle 215 is eliminated entirely.

The rear discharge opening 202 includes a right rear discharge opening 232 and a left rear discharge opening 234. The right rear discharge opening 232 is defined between the right housing end wall 222 and the baffle 215. The left rear discharge opening 234 is defined between the left housing end wall 224 and the baffle 215. The right rear discharge opening 232 includes a width 262 that is approximately half the width of the right blade. The left rear discharge opening 234 includes a width 264 that is approximately half the width of the left blade. Clippings exit the right rear discharge opening 232 and the left rear discharge opening 234 in between the rear drive wheels 104. In some embodiments, clippings exit the right rear discharge opening 232 and the left rear discharge opening 234 both in between and into the rear drive wheels 104 (FIG. 1) for greater grass dispersion area.

The cutting deck 108 further includes a right deflector plate 165 and a left deflector plate 167. The right deflector plate 165 is positioned within the right rear discharge opening 232 and the left deflector plate 167 is positioned within the left rear discharge opening 234 (e.g., at the rear discharge opening 202 of the cutting deck 108). As air and clippings exit the cutting deck 108, the air and clippings pass over the right deflector plate 165 and left deflector plate 167. The right and left deflector plates 165, 167 can deflect clippings down toward the ground (e.g., when the mower 100 is in an operational position shown in FIG. 1).

As the right blade rotates, clippings within the right blade cavity 205 are directed (e.g., pushed) toward the right rear discharge opening 232 as shown by clockwise arrow 236. As the left blade rotates, clippings within the left blade cavity 207 are directed (e.g., pushed) toward the left rear discharge opening 234 as shown by counter-clockwise arrow 238. The clippings (and air) within right blade cavity 205 move in a clockwise direction (e.g., arrow 236) and then straight out of the right rear discharge opening 232 (e.g., shown by arrow 242). The clippings (and air) within the left blade cavity 207 move in a counter-clockwise direction (e.g., arrow 238) and then straight out of the left rear discharge opening 234. (e.g., shown by arrow 244). In some embodiments, the cutting blades in both the right blade cavity 205 and the left blade cavity 207 are reduced-lift blades.

In conventional rear-discharge cutting decks, both of the cutting blades in separate cavities rotate in the same (e.g., counter-clockwise) direction, as viewed from the bottom of the cutting deck. In these conventional side-discharge cutting decks, all the debris and grass clippings in a left cavity are re-processed in the right cavity of the cutting deck before being discharged. As such, the chore motor in the right cavity has to consume more energy because it may be processing twice the amount of grass before discharging the clippings. Additionally, in a conventional system, the chore motor in the left cavity also consumes more energy because it forces air and grass clippings into the flow stream of the right cavity of the cutting deck, rather than straight out of a discharge opening. By using counter-rotating blades for rear-discharge of clippings (and air) from the cutting assembly 600, the power used to cut grass may be reduced by as much as 75%, as compared to conventional systems, where both cutting blades rotate in a same direction.

Figure 14:
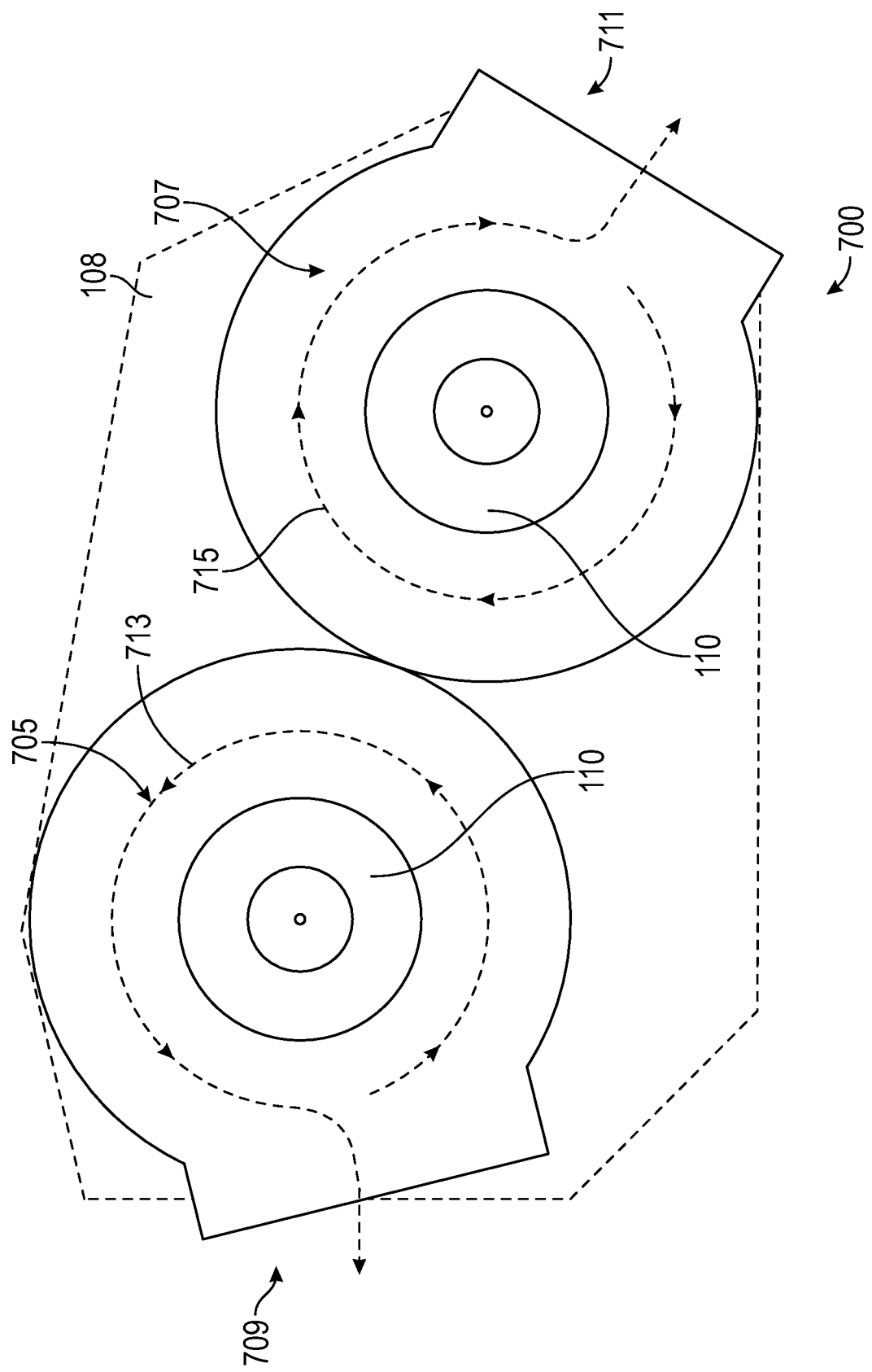
FIG. 14 is a bottom view of another deck that can be incorporated into the electric stand-on mower of FIG. 1, according to another exemplary embodiment.

Referring now to FIG. 14, in other embodiments, the cutting assembly of the cutting deck 108 is rotated on the electric mower 100 such that the rear discharge opening discharges clippings on a side (e.g., one or more of the right side and left side) of the mower 100. FIG. 14 shows a cutting assembly 700 with two side discharge openings. The cutting assembly 700 is shown from an underside of cutting deck 108 and includes a right discharge opening 709 and a left discharge opening 711. The left housing of the cutting assembly 700 includes a left blade cavity 707. As a left blade rotates (e.g., when the chore motor 110 operates within the left blade cavity 707), the clippings are pushed toward the left discharge opening 711, as shown by arrow 715. The right housing of cutting assembly 700 includes a right blade cavity 705. As a right blade rotates (e.g., when chore motor 110 operates within the right blade cavity 705), clippings are pushed toward the right discharge opening 709, as shown by arrow 713. In some embodiments, the cutting assembly 700 includes the same or similar features as the cutting assembly 600, such as the right and left deflector plates 165, 167, right housing end wall 222, left housing end wall 224, etc.

Instead of a right blade cavity 705 and a left blade cavity 707, the cutting deck 108 can include a right pod and a left pod. The right pod and left pod may not be integrated in the same enclosure of the cutting deck 108 (shown by the dashed lines for the cutting deck 108). The right pod houses a right blade and the left pod houses a left blade. Each pod may include a separate discharge opening (e.g., left discharge opening 711 and right discharge opening 709) to discharge clippings cut by the respective blades in the respective pods. Each pod may include a deflector plate similar to the right and left deflector plates 165, 167 described herein. For example, if the cutting deck 108 includes a right pod and a left pod, each pod may be rotated to position the discharge openings such that the clippings disperse to a respective side of the mower 100. Each pod may be on a corresponding side of the mower 100, such that the left pod cuts the grass proximate the left side 101 of the mower and discharges clippings on the left side 101 of the mower 100 via the left discharge opening 711, and the right pod cuts the grass proximate the right side 103 of the mower and discharges clippings on the right side 103 of the mower 100 via the right discharge opening 709. In some embodiments, the pods maybe oriented to discharge clippings in between the drive wheels 104 or in between and into the rear drive wheels 104 (as shown in FIG. 1). In some embodiments, the right and left pods may be independently rotated via a mechanism attached to a motor. The operator may choose a desired direction of discharge for each pod while mowing grass. For example, the motor that rotates each pod may be controlled by a separate motor controller 115 that is configured to instruct the motor to rotate the amount necessary to achieve a specific amount of rotation of the right and left pods. In some embodiments, pod rotation may be programmed to be automatic based on mower operational parameters (e.g., drive lever position). In other embodiments, there may be more than one right pod and one left pod. Several pods in cutting assembly 700 may each be controlled separately to rotate the discharge openings (e.g., left discharge opening 711 and right discharge opening 709) depending on which direction an operator desires debris to discharge. In some examples, the pod positioning is controlled based upon a detected location of the lawn mower 100 (e.g., using GPS, geo-fencing, etc.). The motor controller 115 can detect, for example, that the lawn mower 100 is near a sidewalk and can adjust a position of the pods (and the discharge openings 709, 711) so as to avoid discharging clippings onto the sidewalk.

In conventional applications, all components of the chore motor 110 are positioned above the cutting deck, while the spindle is positioned below the deck. The positioning of the chore motors 110 relative to the cutting deck 108 as described herein allows for the deck 108 to be raised to a higher maximum cutting height (e.g., can be moved between a larger range of heights) without the chore motors 110 interfering with the mower frame. Furthermore, the cutting deck 108 can be raised to a higher height for a transportation mode. As such, the mower 100 can more easily be transported, reducing the difficulty for an operator to clear tall obstructions (e.g. street curbs) while moving the mower 100 back to a transportation vehicle or between jobs. For example, with more clearance between the deck and the ground, the mower 100 may more easily be transported onto a trailer, with a charging system mounted to the floor of the trailer, to recharge the energy storage device 140 on the mower 100. Additionally, being able to raise the deck 108 to a greater height can improve the ease of cleaning the deck 108 of the mower 100. As such, the mower 100 may operate at a greater efficiency with less debris clogging the deck 108. Additionally, being able to raise the deck 108 to a greater height can improve the ease of changing the blades of the mower 100. The positioning of the chore motors 110 relative to the cutting deck 108 as described herein can improve the ease of cleaning the top surface of the cutting deck. Additionally, positioning at least a portion of the chore motors 110 below the cutting deck 108 allows for more space and packaging flexibility to position motor controllers (e.g., motor controllers 115), power cabling, and wire harnesses to prevent interference with the frame when the deck is set to its maximum cutting height or transport height.

In addition, positioning the motor on top of the deck 108, as is conventionally done, allows very little air movement around the motor to convectively cool the motor. Cooling air only comes from ambient air velocity and vehicle velocity. The limited cooling air is also partially blocked (or reduced) by the mower frame and deck mounting bracketry and can be completely blocked if or when the motor is covered by grass and other debris. By positioning the chore motor 110 at least partially under the deck 108, the forced airflow underneath the deck 108 caused by the blade rotation allows for better convective cooling of the chore motors 110. Additionally, positioning a motor on top of the cutting deck 108 can obstruct a user's line of sight during operation of the mower 100. As such, by locating the chore motors 110 sub-flush the cutting deck 108, an operator can reduce the risk of colliding with objects while using the mower 100, such as branches, as well as the risk of driving the mower 100 over an undesirable object that may be harmful to components of mower 100. Positioning at least a portion of the chore motors 110 below the cutting deck 108 can also lower the center of gravity of the mower 100. By decreasing the likelihood of the mower 100 falling to one side with a higher center of gravity, an operator may feel more safe and secure while using the mower 100, especially on hills.

With additional reference now to FIGS. 15-33 various structures that can be used as or on the chore motor 110 are provided. The different structures shown provide a lower-profile design that is both compact and lightweight. The different chore motors 110 shown and described also exhibit improved reliability relative to conventional motors by including different impact and torque-limiting features. The chore motors 110 can include clutch systems that prevent over-torqueing or axial movement of a drive shaft of the chore motor 110 that might otherwise damage the drive shaft. Instead, the drive shaft includes one or more components that allow the drive shaft to decouple from a rotor within the chore motor 110 so that further rotation of the drive shaft is limited (e.g., so as to reduce torque loading and motor 110 overheating).

Figure 15:
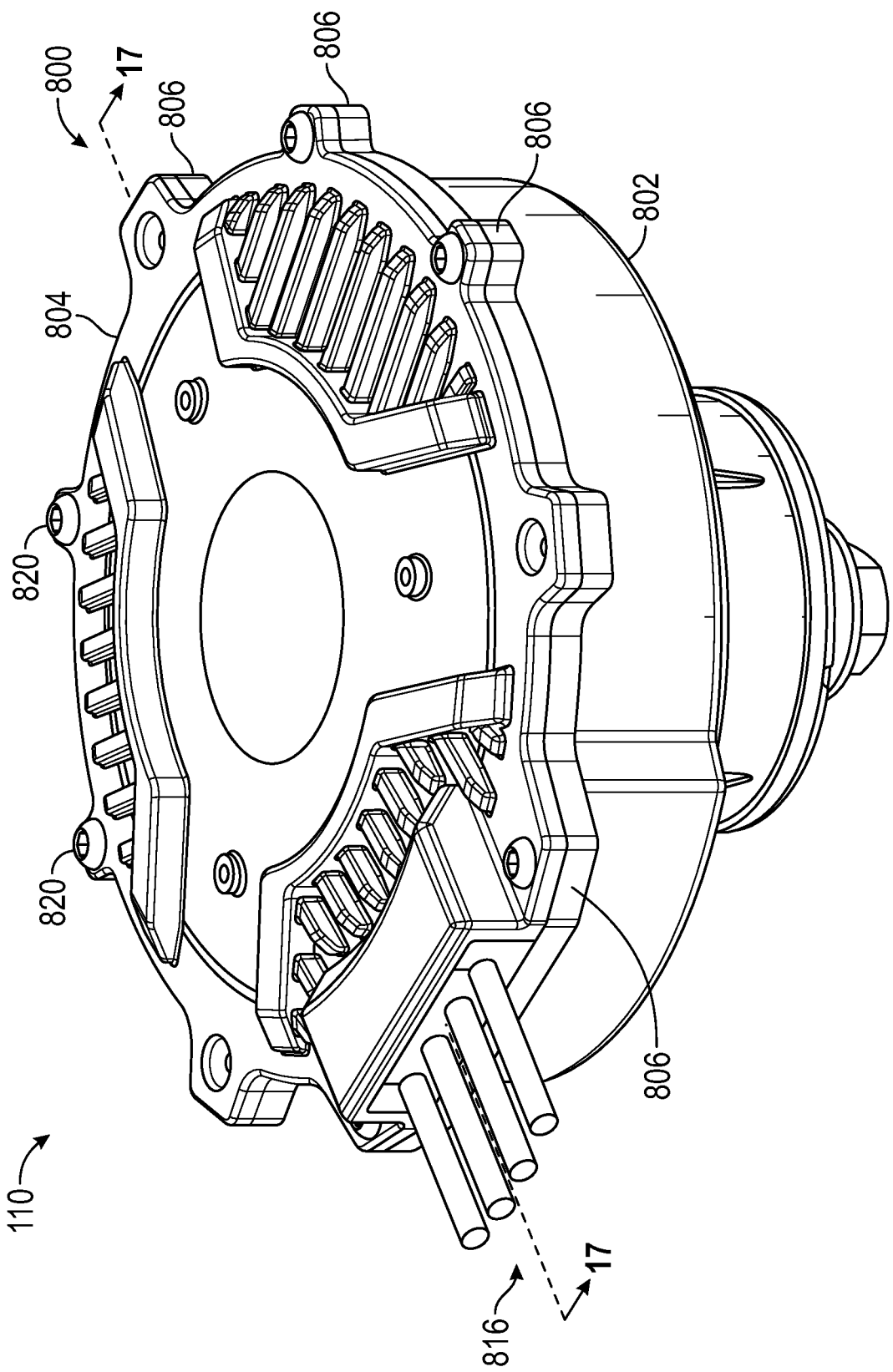
FIG. 15 is a top perspective view of a chore motor that can be incorporated into the electric stand-on mower of FIG. 1.
Figure 16:
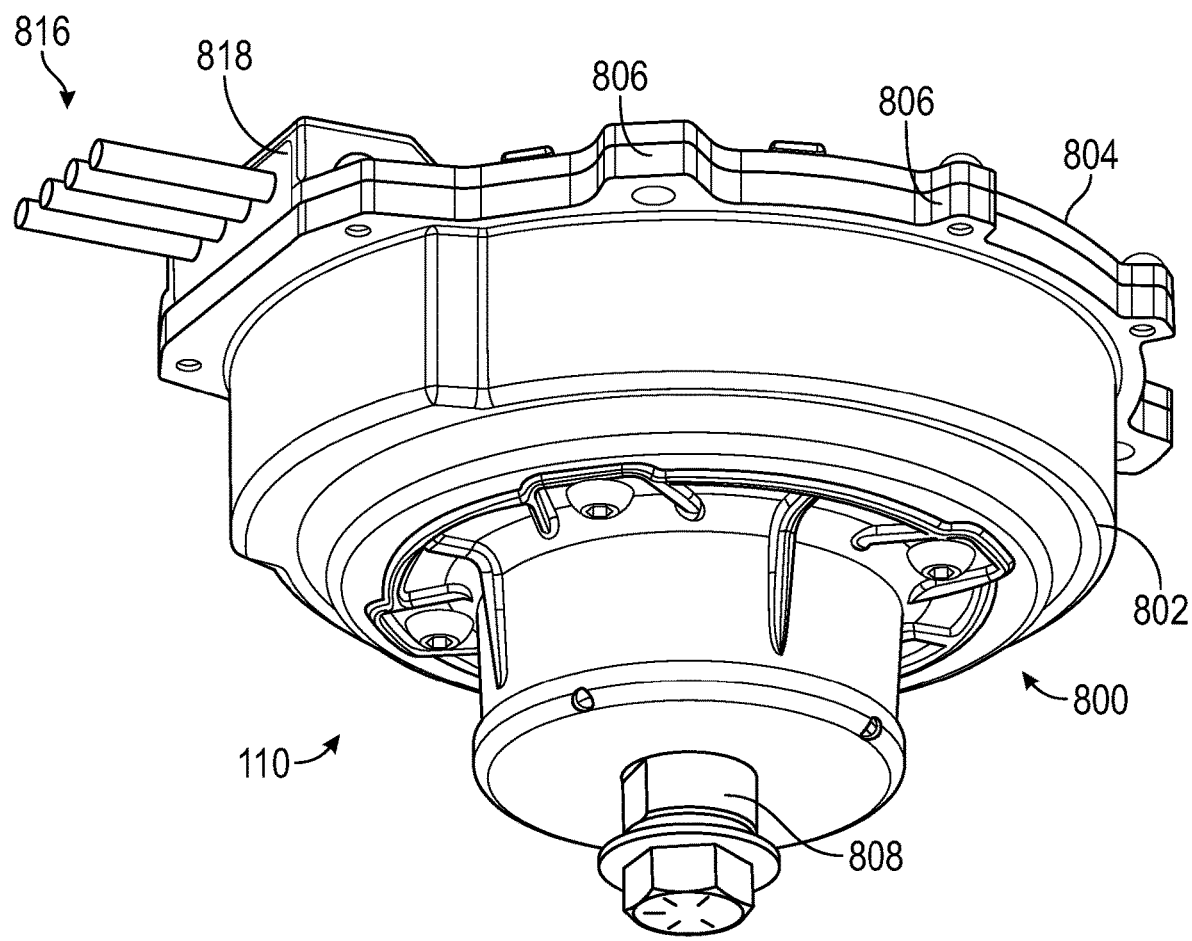
FIG. 16 is a bottom perspective view of the chore motor of FIG. 15.
Figure 17:
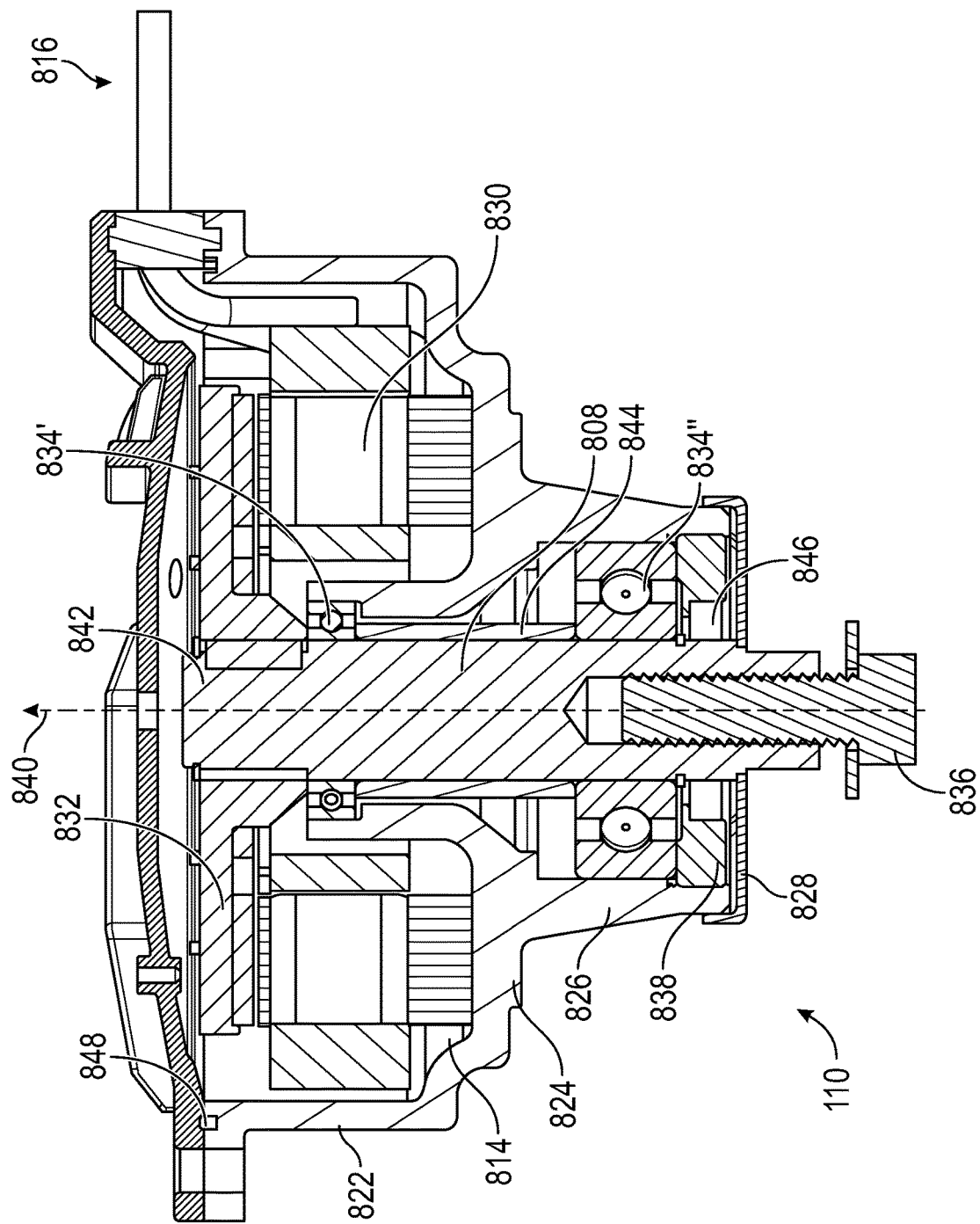
FIG. 17 is a cross-sectional view of the chore motor of FIG. 15, taken along line 17-17 in FIG. 15.

Referring first to FIGS. 15-17, and with continued reference to FIGS. 1-4, chore motors 110 that can be coupled to the cutting deck 108 are shown. The chore motor 110 includes a motor housing 800 formed of a lower housing 802 and a motor cover 804. The motor cover includes one or more flanges 806 that can be used to locate and secure the motor housing 800 within the cutting deck 108. Each of the chore motors 110 are positioned sub-flush to the cutting deck 800, such that a portion of the motor housing 800 extends downward, into the blade cavity (e.g., right blade cavity 205, left blade cavity 207, etc.) formed below the cutting deck 108. In some examples, at least half of the motor housing 800 extends below the cutting deck 108. In some examples, the entire lower housing 802 is positioned at or below the top surface of the cutting deck 108 and only the motor cover 804 extends upward beyond the top surface of the cutting deck 108. Accordingly, at least 80% of the motor housing 800 extends below the cutting deck 108. This differs from conventional electric motor driven cutting decks in which the majority of the electric motor and the motor housing, and in some circumstances the entire motor housing, is located above the top surface of the cutting deck. Locating the motors above the cutting deck limits the ability to vary the height of the cutting deck which in turn limits the ability to control the cutting height of the grass to be cut because the portion of the motor located above the top of the cutting deck creates clearance problems between the motor and the frame of the mower. The low-profile and sub-flush positioning of the chore motor 110 increases the available range of vertical travel for the cutting deck. The motor housing 800 can be coupled to the cutting deck 108 using fasteners, for example, which can extend through the flanges 806 formed within the motor housing 800.

The chore motors 110 each include and support a cutting blade 112, which is coupled to a drive shaft 808. As explained in additional detail below, the drive shaft 808 can be a shaft assembly formed of one or more components that are configured to provide impact or torque limiting functionality to the drive shaft 808 to reduce the likelihood of drive shaft 808 failure during operation. The cutting blade 112 can be selectively coupled to the drive shaft 808 in a variety of ways, including by fastener (e.g., by securing a fastener through a central hole in the blade 108 and threading the fastener into the drive shaft 808) or using a quick-release mechanism (e.g., the quick-disconnect mechanism 950, shown in FIG. 19). In some examples, the blade 112 is configured to decouple from the drive shaft 808 in response to a force exceeding threshold values determined by the mechanical couplings formed between the drive shaft 808 and blade 112.

FIGS. 15-17 depict a first chore motor 110 that can be used within the lawn mower 100. As explained above, the chore motor 110 generally includes a motor housing 800 formed of a lower housing 802 and a motor cover 804 extend above the lower housing 802. The lower housing 802 generally includes a frustoconical shape that defines a motor cavity 814 to receive and secure the drive components of the chore motor 110. The motor cover 804 supports and defines a wired electrical input 816 (e.g., a wire harness) that provides an electrical connection from the energy storage device 140 to the chore motor 110. In some examples, the wired electrical input 816 can also extend one or more wires to the motor controller 115 or to the dashboard 150. A rubber grommet 818 can be positioned between the lower housing 802 and the motor cover 804 to create a leak-proof seal that permits the passage of the wired electrical input 816 into the motor cavity 814. The motor cover 804 and lower housing 802 together can protect the chore motor 110 from external debris, including grass clippings, water, and/or dust. As depicted in FIGS. 15-17, the motor controller 115 and other operational electronics are positioned outside of the motor housing 800, allowing the chore motor 110 to have a compact, flat design that lowers the overall profile of the chore motor 110. In some examples, an O-ring 848 is positioned within a groove in the lower housing 802 to provide additional fluid and debris sealing between the motor cover 804 and the lower housing 802.

In addition to the size reduction of the chore motor 110 relative to conventional motors, the chore motor 110 is also lightweight. In some examples, the motor cover 804 is made of a polymeric material, such as acrylonitrile butadiene styrene (ABS) or polyethylene (e.g., LDPE, HDPE, UHMW, etc.) to reduce the overall weight of the chore motor 110. The motor cover 804 is readily removable from the lower housing 802 through the use of fasteners 820. In some examples, fasteners 820 can be used to couple the motor cover 804 to the lower housing 802 and to couple the overall motor housing 800 to the cutting deck 108. The fasteners 820 can extend through the flanges 806 within the motor housing 800 to secure the motor cover 804 onto the lower housing 802.

The lower housing 802 and motor cover 804 together protect internal components of the chore motor 110 from debris. As depicted in FIGS. 16-17, the lower housing 802 has a generally frustoconical shape having a tiered outer structure defined by a first exterior wall 822, a first base 824, a second exterior wall 826, and a second base 828. The first exterior wall 822 extends downwardly and approximately perpendicularly away from the flange 806 to the first base 824. The first base 824 extends radially inward from the first exterior wall 822 to the second exterior wall 826. The second base extends inwardly away from the second exterior wall 826 and forms a base of the lower housing 802. In some examples, the second exterior wall 826 is formed by an endcap, while each of the first exterior wall 822, first base 824, and second exterior wall 826 are formed from a common, unitary casting. The first wall 822, first base 824, second exterior wall 826, and second base 828 together define the motor cavity 814. In some examples, the second base 828 serves as a trash shield to deflect and prevent clippings or debris displaced by the blade 112 from entering into the motor housing 800. This endcap can be formed of a high strength material, such carbon steel or stainless steel, for example. The lower housing 802 can otherwise be formed from aluminum or other lightweight materials. Alternatively, the lower housing 802 can be formed from a carbon-based steel, stainless steel, or a variety of alloy materials. In some examples, the entire lower housing 802, except the wired electrical input 816 is configured to sit sub-flush relative to the cutting deck 108.

With specific reference to FIG. 17, the internal components of the chore motor 110 are shown in detail. The chore motor 110 generally includes the coil assembly 830, a rotor 832, one or more bearings 834, a drive shaft 808, a fastener 836 to couple the blade 112 to the drive shaft 808, and a shaft adjustment nut 838. The chore motor 110 is configured to rotate a drive shaft 808 using the coil assembly 830 and the rotor 832. The rotor 832 rotates within the motor housing 800 and relative to the coil assembly 830 in response to the fluctuating magnetic fields generated by the coil assembly 830. The drive shaft 808 is coupled to the rotor 832, and is configured to rotate about a shaft axis 840. As depicted in FIG. 17, the drive shaft 808 includes one or more protrusions 842 (e.g., formed integrally with or otherwise coupled) that interface with notches formed in the rotor 832 to form a keyed connection. The keyed connection can form a secure but removable coupling between the drive shaft 808 and the rotor 832 that transmits torque from the rotor 832 to drive the shaft 808. In some examples, the shaft forms an interference fit with a hole formed within a center of the rotor 832 so that the two components will rotate in unison with one another when a current is applied to the coil assembly 830.

As depicted in FIGS. 15-17, the chore motor 110 includes a wired electrical input 816. As explained above, the wired electrical input 816 can be used to couple the chore motor 110 to one or more of the energy storage device 140 and a motor controller 115. The motor controller 115, as explained above, can control the operation (and operational parameters) of the chore motor 110. The wired electrical input 816 can provide either alternating current (AC) power or direct current (DC) power to a coil assembly 830 received within the motor cavity 814. In some examples, the wired electrical input 816 receives DC power from the energy storage device 140 and provides the DC power to an inverter (not shown) within the lower housing 802 that transforms the DC power to AC power to be delivered to the coil assembly 830. Alternatively, the inverter can be positioned outside the motor housing 800 (e.g., near the energy storage device 140, for example) and can transform the DC power from the battery to AC power before delivering any electrical power to the wired electrical input 816. Accordingly, the wired electrical input 816 may only receive AC power. The chore motors 110 can be rated at 1.8 kW or 3.0 kW, for example.

The power from the energy storage device 140 is used to drive the rotor 832. As explained above, the coil assembly 830 is electrically coupled to an external power source through the wired electrical input 816 and receives power from the wired electrical input 816. The external power source can be the energy storage device 140, for example, in communication with a controller (e.g., motor controller 115) that controls the coil assembly 830 by providing variable power (e.g., varying duty cycles, varying frequencies, varying amplitudes, etc.) to the coil assembly 830. By controlling the power flow to the coil assembly 830, the motor controller 115 can control the speed and torque of the rotor 832. The coil assembly 830 is formed of several wound coils that receive the electrical power and generate electrical electromagnetic fields based upon the currents passing through the coils. The rotor 832 includes one or more magnets (or is formed of a magnetic material, for example) that are configured to interact with the electromagnetic fields generated within the motor housing 800. The fluctuation of the electromagnetic fields creates a torque on the rotor 832 sufficient to drive the rotor 832 within the motor housing 800, relative to the coil assembly 830. Based upon the known magnetism of the rotor 832, the motor controller 115 can calculate the specific amount or form (e.g., amplitude, frequency, duty cycle) of electrical current to match desired torque and speed values inputted to the motor controller 115.

Opposite the rotor 832, the drive shaft 808 supports the cutting blade 112. The cutting blade 112 can be removably coupled to the drive shaft 808 using the fastener 836 so that when the drive shaft 808 rotates, the cutting blade 112 will rotate as well. Based on the central alignment, the cutting blade 112 will also rotate about the shaft axis 840. The drive shaft 808 can include internal threads that receive and support the fastener 836, which may be formed of a material capable of withstanding high torsional stresses (e.g., medium carbon steel, boron steel, medium carbon alloy steel, etc.). The drive shaft 808 can also be formed of a material capable of withstanding high torsional stresses so that the drive shaft 808 is resistant to fracturing. For example, the shaft 808 can be made of impact-resistant aluminum, stainless steel, medium carbon steel, high carbon steel, or other types of steel or alloy-based materials.

The bearings 834 and a shaft spacer 844 help support rotation of the drive shaft 808 within the motor housing 800. The bearings 834 each extend around and receive the drive shaft 808 to limit potential radial movement of the drive shaft 808 relative to the lower housing 802. In some embodiments, the bearings 834 are ball bearings that allow the drive shaft 808 to rotate about the shaft axis 840. The bearings 834 can be self-lubricated bearings that do not require additional lubrication. In some examples, the bearings 834 can include a first bearing 834' and a second bearing 834", and the second bearing 834" is larger (both axially and radially) than the first bearing 834'. The coupling between the blade 112 and the drive shaft 808 (by way of the fastener 836) may receive large impacts during motor 110 operation that can be transmitted through to the bearings 834. To limit the possible damage experienced by the bearings, the drive shaft 808 is cantilevered outward from the lower housing 802, and the bearings 834 are spaced apart from one another along the shaft axis 840. By spacing the first bearing 834' from the second bearing 834", the moment arm between the bearings 834 is increased and the bearings 834 require less counterforce to keep the drive shaft 808 within vertical alignment along the shaft axis 840. The shaft spacer 844 can extend around the drive shaft 808 and axially between the two bearings 834', 834" to maintain the spacing between the bearings 834. In some examples, the shaft spacer 844 is a metal sleeve the surrounds but does not contact the drive shaft 808.

In some examples, the bearings 834 are unfixed bearings (e.g., floating bearings) and can move within the motor cavity 814. Similarly, the shaft spacer 844 can be configured to move within the lower housing 802. The axial position of the bearings 834 can be adjusted using the shaft adjustment nut 838. The shaft adjustment nut 838 is a metallic component that is located under and supports the second bearing 834". The shaft adjustment nut 838 defines a through hole and surrounds the drive shaft 808, and is threadably coupled to the lower housing 802. As depicted in FIG. 17, the second exterior wall 826 can define internal threads that receive the shaft adjustment nut 838. The shaft adjustment nut 838 can be adjusted using a wrench or other specialized tool and is axially adjustable (e.g., along the shaft axis 840) relative to the lower housing 802 about the threads formed within the lower housing 802. Because the shaft adjustment nut 838 supports the second bearing 834", upward or downward movement of the shaft adjustment nut 838 causes upward or downward movement of the second bearing 834". The second bearing 834" simultaneously supports the shaft spacer 844 and the first bearing 834', such that moving the shaft adjustment nut 838 about the shaft axis 840 causes each of the bearings 834 and the shaft spacer 844 to move axially about the shaft axis 840 as well.

In some examples, the first bearing 834 further supports each of the rotor 832 and the drive shaft 808, such that adjustment of the shaft adjustment nut 838 also moves the rotor 832 and drive shaft 808 within the motor housing 800. Moving the rotor 832 relative to the lower housing 802 and relative to the coil assembly 830 adjusts a gap between the coil assembly 830 and the rotor, which can alter the performance of the chore motor 110. As the gap between the rotor 832 and coil assembly 830 changes, so does the electromagnetic forces that can be exerted from the coil assembly 830 onto the rotor 832. Accordingly, the efficiency, output power, and performance of the chore motor 110 are adjustable by moving the shaft adjustment nut 838.

The ability to adjust the gap size between the rotor 832 and coil assembly 830 avoids the need for expensive, tight tolerance manufacturing processes that are commonly used within other motor designs. The gap is important as the electromagnetic forces of the coil assembly 830 provide a varying amount of power to the magnets on the rotor 832 as the gap changes. Commonly, electric motors will have tight tolerances to assure the gap is the right size. This is both costly and time consuming as tight tolerances may require manufactures to take extra time to ensure the tolerances are met. By including the shaft adjustment nut 838, a user can adjust the gap while running the motor 110 using the feedback from the compact chore motor 110 to determine the proper size of the gap. The user can then get the gap to correct size and increase the effective efficiency of the motor 110. The adjustable nature of the gap within the chore motor 110 allows the motor 110 to be manufactured using looser tolerances, which saves money and manufacturing time.

In some examples, the shaft adjustment nut 838 may further include a dust seal 846. The dust seal 846 along with the O-ring 848 prevent dust and debris from entering the motor cavity 814 of the motor 110. As the motor 110 is an electric motor operating using electricity, water, dust, and other conducting material can damage the internal components of the motor 110. The O-ring 848 helps to create a fluid and debris-proof seal between the motor cover 804 and the lower housing 802 and the dust seal 846 prevents dust from entering from the area between the drive shaft 808 and the second base 828.

The sub-flush arrangement of the chore motor 110 relative to the cutting deck 108 provides several advantages over conventional designs, which sit entirely above the cutting deck 108. For example, positioning the chore motor 110 sub-flush relative to the cutting deck 108 allows the cutting deck to be raised to a higher height during the grass cutting operation, enabling a wider range of grass heights. Additionally, positioning the motor below the cutting deck 108 has been found to reduce the accumulation of grass and/or other debris on the chore motor 110, which in turn reduces the likelihood of the chore motor 110 overheating. Finally, positioning the chore motor 110 below the cutting deck 108 and within the blade cavity can further improve cooling by exposing the lower housing 802 to the convective airflow created by the rotating cutting blades 112.

Additionally, the arrangement of the motor controller 115 and the electrical power supply (e.g., the energy storage device 140) outside of the motor housing 800 allows the motor to take on a much more compact shape and design. Positioning the controller 115 and electrical power supply outside of the motor housing 800 decreases the number of heat generating components within the motor housing 800, which can address shortfalls in conventional motors that struggle to distribute heat generated by the motor and often suffer from overheating. Overheating can cause inefficiencies within the motor, which loses power, wastes electricity, and may not be able to perform its required functions. By moving both the power supply and control elements outward from the motor housing 800, the chore motor 110 is much more efficient, and can provide more power and better performance using a smaller energy source. The chore motor 110 can be cooled without the use of an external coolant. Similarly, the motor housing 800 (and motor cover 804, specifically) can have a much flatter and smaller profile over the top of the cutting deck 108, which allows the overall chore motor 110 to be smaller and lighter weight.

Figure 18:
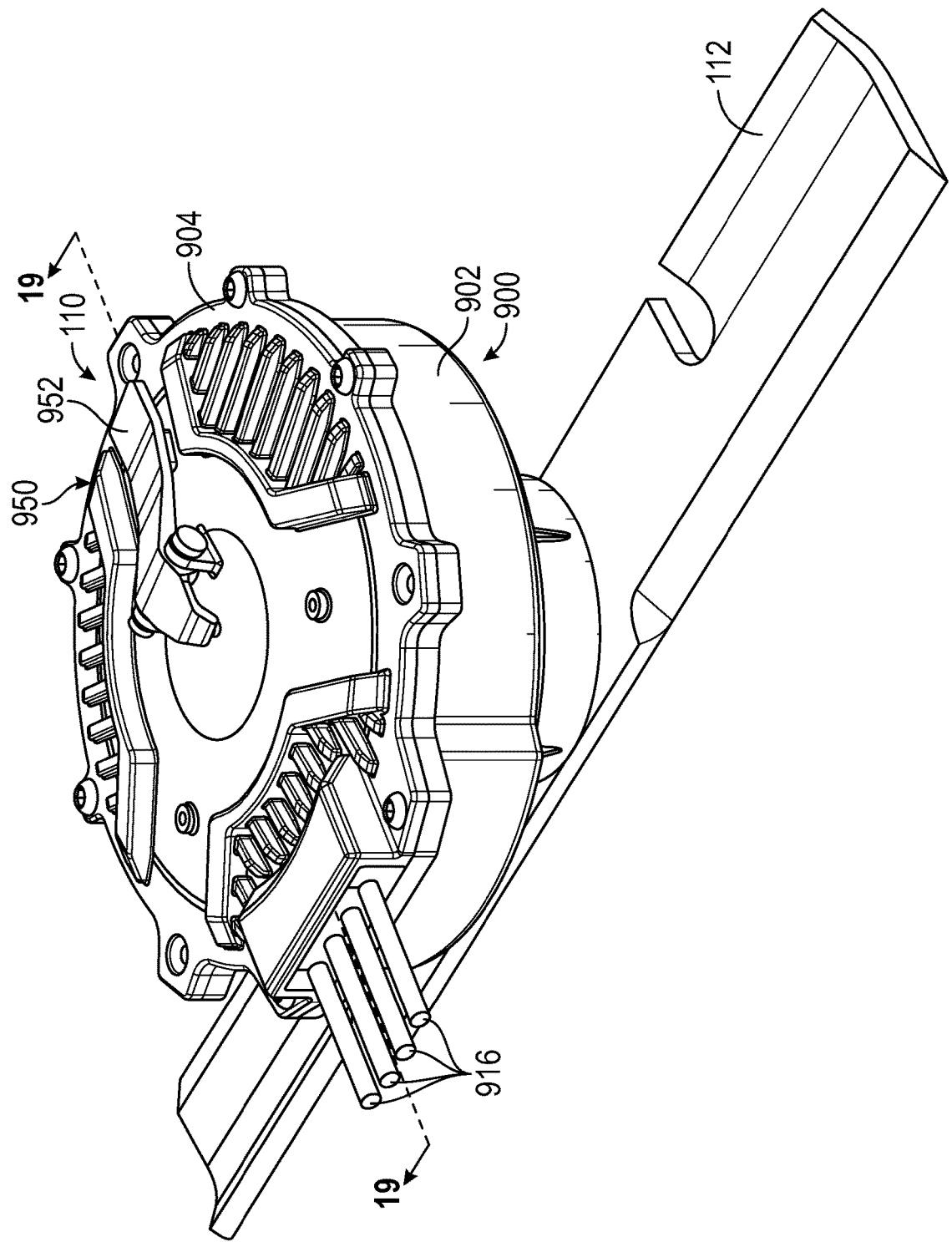
FIG. 18 is a top perspective view of another chore motor that can be incorporated into the electric stand-on mower of FIG. 1.
Figure 19:
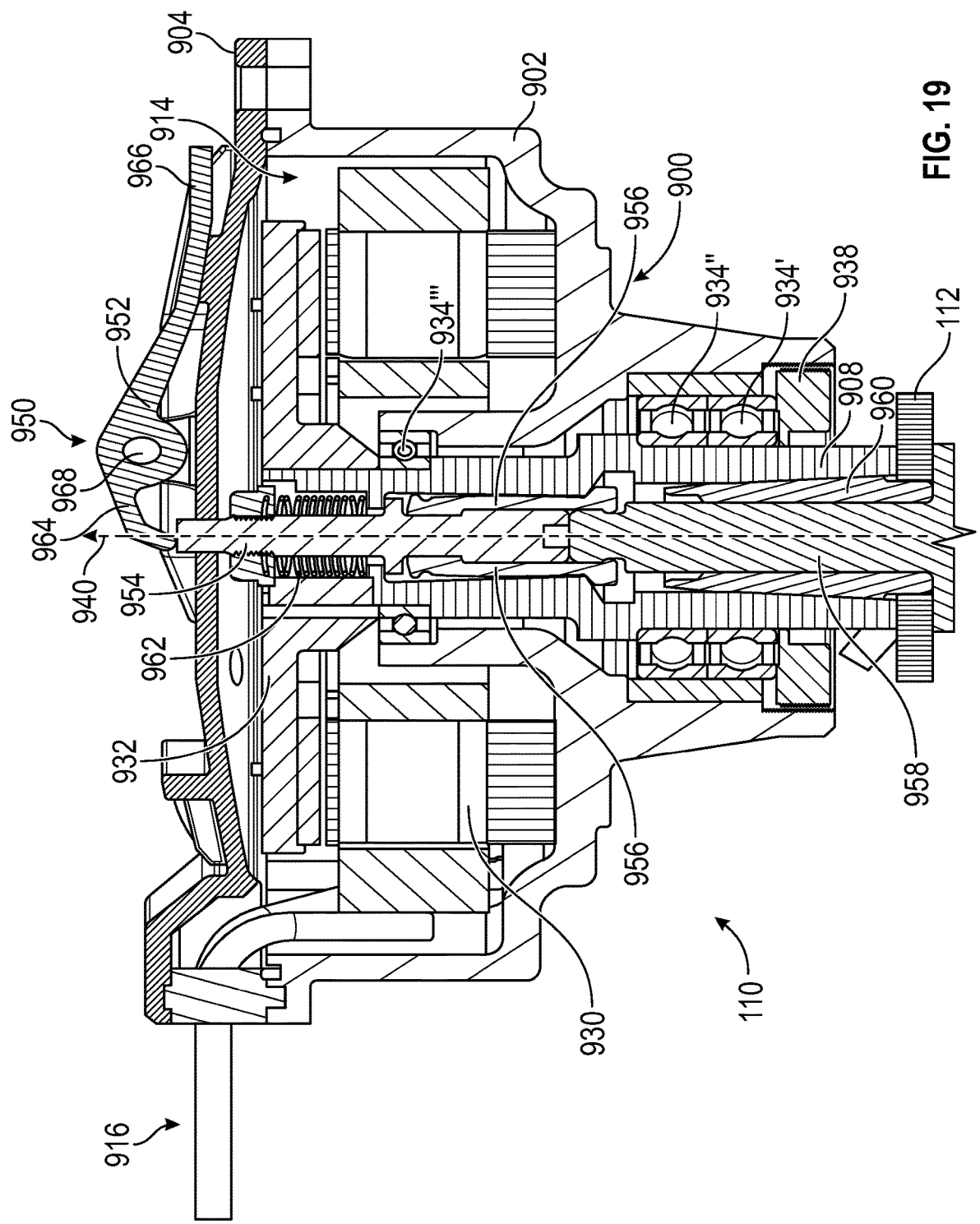
FIG. 19 is a cross-sectional view of the chore motor of FIG. 18, taken along line 19-19 in FIG. 18.

Referring now to FIGS. 18-19, another exemplary chore motor 110 that can be used within the lawn mower 100 is shown. The chore motor 110 shown in FIGS. 18-19 includes a motor housing 900 that is substantially similar to the motor housing 800, and is defined by a lower housing 902 and a motor cover 904. A wired electrical connection 916 is defined by the motor cover 904 and the lower housing 902 and provides a supply of electrical power into the motor cavity 914 that can be used to generate electromagnetic fields within a coil assembly 930 that in turn rotate a rotor 932 and a drive shaft 908 that is coupled to the rotor 932.

The chore motor 110 shown in FIGS. 18-19 further includes a quick-disconnect mechanism 950 to couple a drive shaft 908 of the motor 110 to the blade 112. The quick-disconnect mechanism 950 generally includes a handle 952 that interacts with a pull stud 954, clamping fingers 956, a clamping stud 958, and a tapered collet 960 each received at least partially within the drive shaft 908. A series of spring washers 962 (e.g., Belleville washers) are received within the lower housing 902 and bias the pull stud 954, clamping fingers 956, clamping stud 958, and the tapered collet 960 upward, into the drive shaft 908. The handle 952 is generally defined by a cam 964, a lever 966 opposite the cam 964, and a pivot joint 968 formed on the motor cover 904. The handle 952 is rotatable between a first (or open) position and a second (or closed) position that is shown in FIG. 19.

In the open position, the handle 952 is rotated upwardly, so that the lever 966 extends approximately perpendicular to the motor cover 904. In this position, the cam 964 exerts a downward force on the pull stud 954 that in turn forces the clamping fingers 956, clamping stud 958, and tapered collet 960 downward, against the bias of the spring washers 962. As the clamping fingers 956 and tapered collet 960 are pushed downward, the clamping fingers 956 and tapered collet 960 each flex outward, toward their original or resting shapes, which releases the clamping stud 958. The clamping stud 958 and blade 112 can then be pulled downward until the clamping fingers 956 and tapered collet 960 release the clamping stud 958 and blade 112 from the quick-connect assembly 950. Accordingly, the blade 112 can be removed from the chore motor 110 without the use of tools.

The clamping stud 958 and blade 112 can be recoupled to the quick-disconnect assembly 950 by pushing the clamping stud 958 and blade 112 (which is received around a shaft of the clamping stud 958 and supported on a base of the clamping stud 958) upward until a head of the clamping stud 958 is re-engaged by the clamping fingers 956. With the clamping fingers 956 engages around the clamping stud 958, the handle 952 can be rotated to the closed position shown in FIG. 19.

Rotating the handle 952 to the closed position changes the position of the cam 964, which reduces the downward force exerted on the spring washers 962. The spring washers 962 can then resiliently return toward their resting position and force the pull stud 954, clamping fingers 956, clamping stud 958, tapered collet 960, and blade 112 upward, along the shaft axis 940. The internal shape of the drive shaft 908 causes the clamping fingers 956 and tapered collet 960 to flex inward, around the clamping stud 958 to secure the clamping stud 958 within the drive shaft 908. The clamping stud 958 is pulled upward so that the base of the clamping stud 958 compresses and secures the blade 112 with the bottom of the drive shaft 908. Accordingly, the drive shaft 908 and blade 112 are securely coupled together without the use of tools.

Various alterations can be made to the quick-disconnect mechanism 950 to achieve the same results. For example, the handle 952 can be formed as a lever that is pushed or pulled by a user to adjust a downward axial force on the spring washers 962. In still other examples, the handle 952 is a knob that is configured to be rotated to adjust an axial force exerted on the spring washers 962. The handle 952 may be twisted about the shaft axis 940 and can include an intermediate position that pushes the pull stud 954 down along the shaft axis 940. In some examples, the handle 952 includes an uneven washer that, when rotated, pushes the pull stud 954 downward. In other embodiments, the handle 952 is rotated about the shaft axis 940 and includes a mechanism that translates the rotational force into a downward force on the tapered collet 960, pushing the tapered collet 960 downward and loosening the tapered collet 960 clamping force on the clamping stud 958. In some examples, the spring washer 962 is replaced by a torsion spring that provides a torsional force to the mechanism that translates the rotational force into downward axial force. This axial force can then be used to adjust the position of the pull stud 954, clamping fingers 956 and tapered collet 960 to allow the clamping stud 958 and blade 112 assembly to be readily inserted and removed from the quick-disconnect mechanism 950.

As depicted in FIG. 19, the chore motor 110 can also include a floating or moving bearing assembly. The drive shaft 908 includes a tiered outer shape having a first shoulder configured to sit upon or otherwise be supported by the bearings 934', 934" within the motor housing 900. The drive shaft 908 further includes a second shoulder positioned above the first shoulder that is configured to support and receive a third, smaller bearing 934". A shaft adjustment nut 938 can again be threaded into the lower housing 902 and can be movable, axially along the shaft axis 940, to adjust a position of the bearings 934, which in turn adjusts a position of the rotor 932 relative to the coil assembly 930. Accordingly, the gap between the rotor 932 and the coil assembly 930 can be adjusted to allow the motor 110 to be tuned to a desired efficiency or output.

In conventional deck motors, the cutting blade 112 is often selectively coupled to the shaft using a fastener, like a bolt. As the bolt requires tools (sometimes specialized) to remove, often an owner of lawn mower will have to take the outdoor power equipment into a manufacturer or repair shop to change the blades, which incurs cost and causes delay. The quick-disconnect mechanism 950 allows a user to readily change blades 112 within the field and does not need specialized tools to change the cutting blade 112 on the lawn mower 100. Instead, the user can pull or lift the handle 952 and the blade 112 can be removed. A user can then easily switch blades and avoid the expense of having to take the chore motor 110 in for service.

Figure 20:
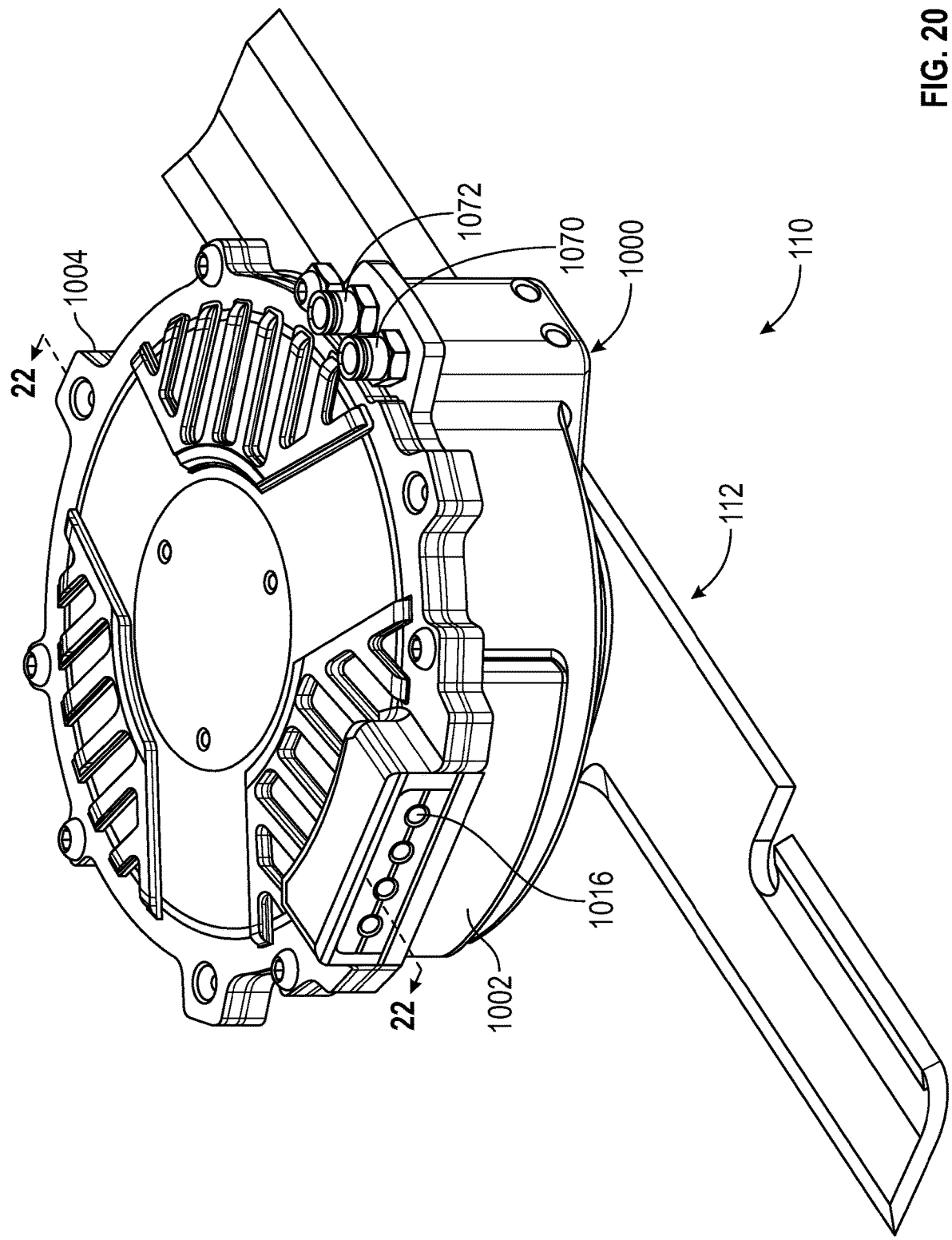
FIG. 20 is a top perspective view of another chore motor that can be incorporated into the electric stand-on mower of FIG. 1.
Figure 21:
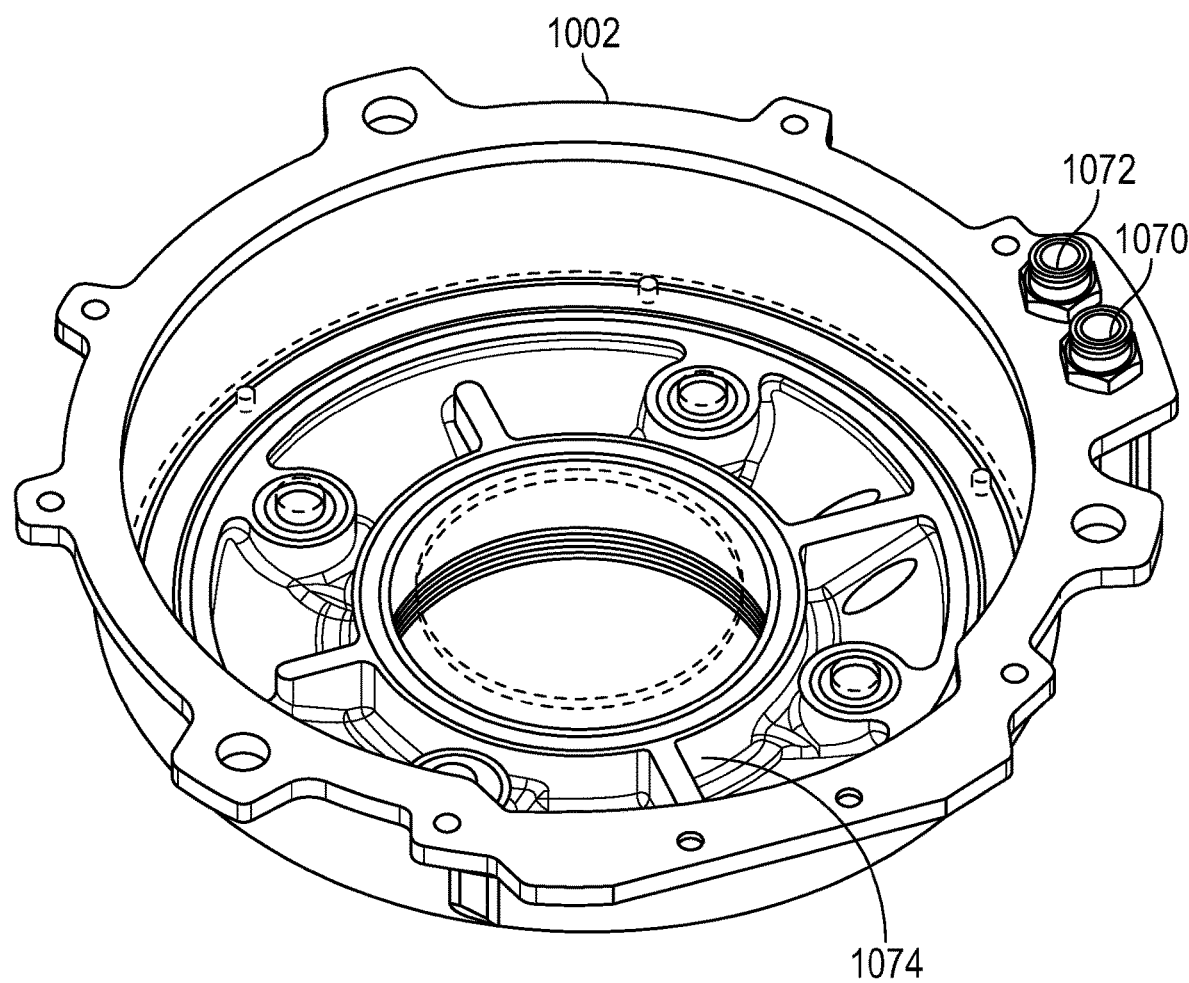
FIG. 21 is a top perspective view of a lower housing of the chore motor of FIG. 20.
Figure 22:
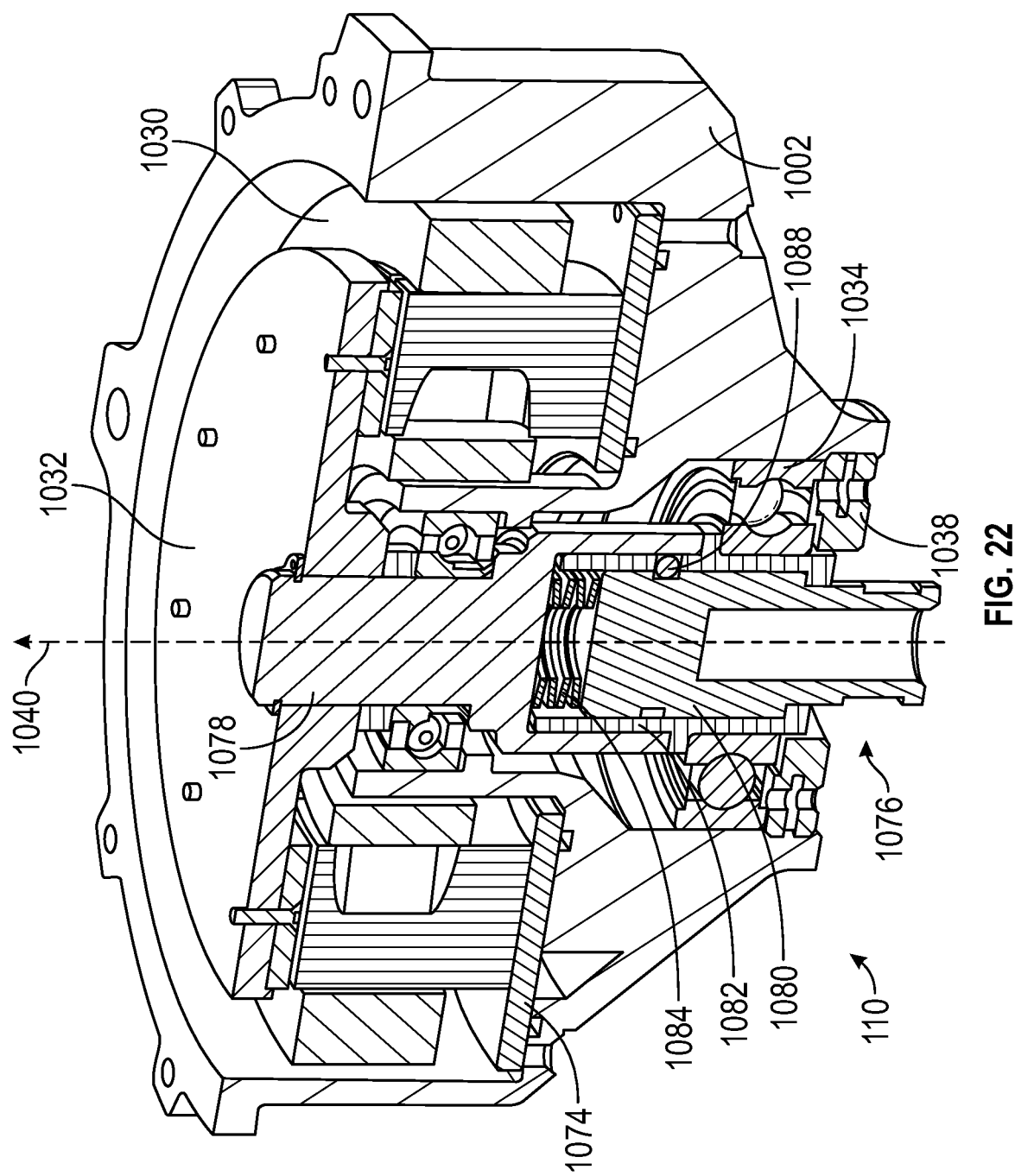
FIG. 22 is a cross-sectional view of the chore motor of FIG. 20, taken along line 22-22 in FIG. 20.

FIGS. 20-22 depict another chore motor 110 that can be used within the lawn mower 100 shown in FIG. 1. The chore motor 110 shown in FIGS. 20-22 includes a motor housing 1000 that is substantially similar to the motor housings 800, 900 and is defined by a lower housing 1002 and a motor cover 1004. A wired electrical connection 1016 is defined by the motor cover 1004 and the lower housing 1002 and provides a supply of electrical power into the motor cavity 1014 that can be used to generate electromagnetic fields within a coil assembly 1030 that in turn rotate a rotor 1032 and a drive shaft 1008 that is coupled to the rotor 1032. A shaft adjustment nut 1038 is coupled to the lower housing 1002 to adjust an axial position of the drive shaft 1008 and rotor 1032 relative to the coil assembly 1030.

The chore motor 110 is configured to receive a coolant. As depicted in FIGS. 20-22, the lower housing 1002 of the chore motor 110 includes coolant passages 1070, 1072 that are in communication with an onboard coolant system on the lawn mower 100 or piece of outdoor power equipment. The coolant passages 1070, 1072 may include a coolant inlet 1070 and a coolant outlet 1072, respectively, that direct coolant from an external source into and around the motor housing 1000 and then outward from the chore motor 110. The lower housing 1002 can further define a coolant plate 1074 that defines the flow path of coolant through the motor housing 1000. Coolant is inlet into the coolant inlet 1070 and passed into the coolant plate 1074, which acts as a coolant reservoir beneath the coil assembly 1030. Coolant passes from the coolant plate 1074 and outward to the coolant outlet 1072. The coolant plate 1074, when filled with coolant, is a heat sink for the heat produced by the motor 110. As heat builds up within the motor 110, the efficiency, power production, and functionality may suffer. Accordingly, the coolant system helps the motor 110 to reach a peak efficiency and allows the motor 110 to be run for a longer time. The coolant can be water, for example, or other suitable coolants having high specific heat values.

Figure 23:
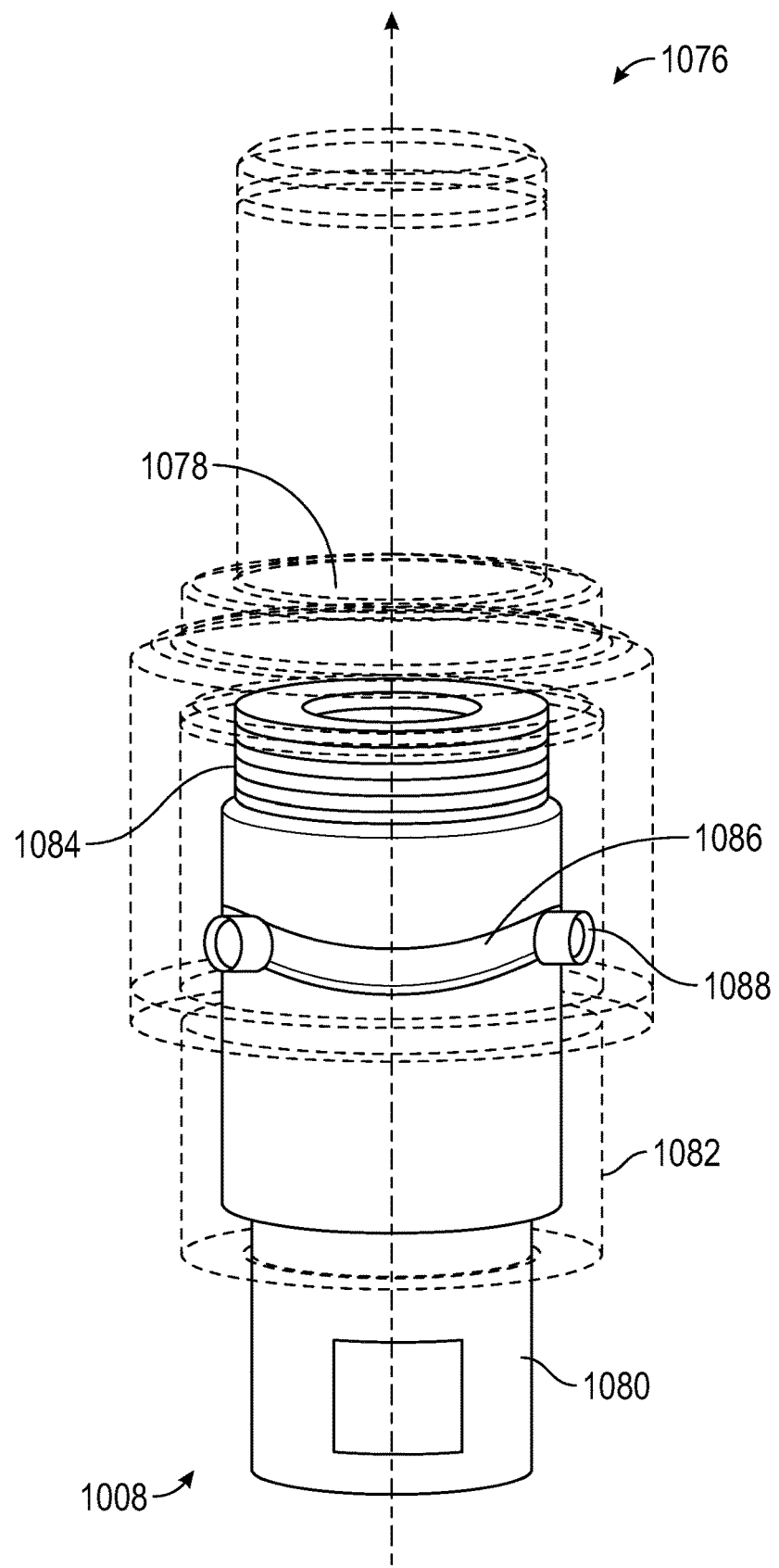
FIG. 23 is a perspective view of a shaft assembly that is incorporated into the chore motor of FIG. 20.

With additional reference to FIG. 23, the drive shaft 1008 of the motor 110 is formed by a torque and impact limiting shaft assembly 1076. The shaft assembly 1076 includes a first shaft 1078, a second shaft 1080, and an intermediate or "connecting shaft" 1082. The second shaft 1080 is received within a cylindrical cavity inside the connecting shaft 1082 and is biased away from the first shaft using a series of stacked spring washers 1084 positioned between the first shaft 1078 and the second shaft 1080. The connecting shaft 1082 is received within the first shaft 1076 as well, so that a portion of each of the connecting shaft 1082 and the second shaft 1078 extend into the cylindrical cavity defined by the first shaft 1078. An undulating track 1086 is formed within an outer surface of the second shaft 1080 to define a pathway for one or more (e.g., three) balls bearings 1088. The ball bearings 1088 allow for relative rotation between the connecting shaft 1082 and the second shaft 1080 if the second shaft experiences significant torque or impact loading.

Each of the shafts 1078, 1080, 1082 rotate together under normal operating conditions (e.g., normal blade spinning). The bias from the spring washers 1084 pushes the second shaft 1080 away from the first shaft 1078, such that the ball bearings 1088 will remain at or near the peaks of the bearing track 1086. Accordingly, the top of the second shaft 1080 is as far away from the first shaft 1078 as possible while maintaining the coupling between the second shaft 1080 and the connecting shaft 1082. The torque from the rotor 1032 is transmitted through the first shaft 1078, to the connecting shaft 1082, and through the ball bearings 1088 to the second shaft. Accordingly, the rotor 1032 and the second shaft 1080 rotate simultaneously.

If the blade 112 or second shaft 1080 are subjected to a significant torque or axial force, the second shaft 1080 will be decoupled from the first shaft 1078 so that the first shaft 1078 can continue rotating without risk of damaging the first shaft 1078. If a significant torque is placed onto the blade 112 (e.g., from hitting a rock, stump, tree, etc.), the second shaft 1080 will begin to rotate relative to the connecting shaft 1082. The ball bearings 1088 will begin to roll within the track 1086 so that relative motion between the rotor 1032 and the second shaft 1080 is permitted. The undulating nature of the track 1086 will cause axial movement between the second shaft 1080 and the connecting shaft 1082 as well, which is opposed by the spring washers 1084. The natural bias of the spring washers 1084 will eventually cause the second shaft 1080 to reset itself relative to the connecting shaft 1082 once the torque loading has been removed, such that normal operation can continue. Similarly, if a significant axial force is placed on the blade 112, the second shaft 1080 can move inward, toward the first shaft 1078 against the bias of the spring washers 1084 along the path defined by the bearing tracks 1086 and ball bearings 1088. Accordingly, the first shaft 1078 can continue to rotate about the shaft axis 1040, independent of the second shaft 1080, so that a costly fracture to the shaft assembly 1076 can be avoided. Once the axial loading is removed, the spring washers 1084 will naturally realign the ball bearings 1088 within the track 1086 so that normal operation (e.g., the second shaft 1080 and first shaft 1078 rotating in unison) can continue.

Figure 24:
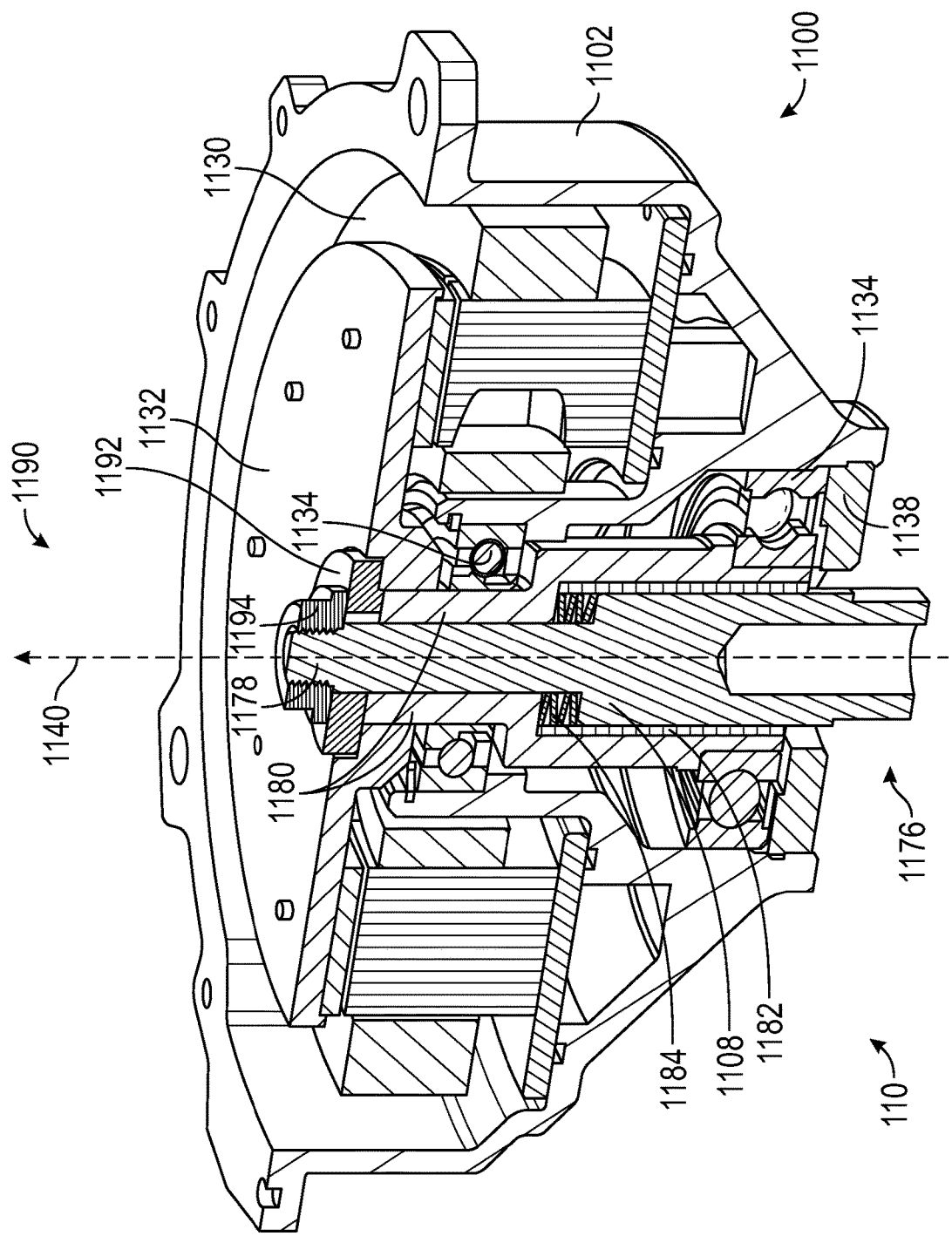
FIG. 24 is a cross-sectional view of another chore motor that can be incorporated into the electric stand-on mower of FIG. 1.
Figure 25:
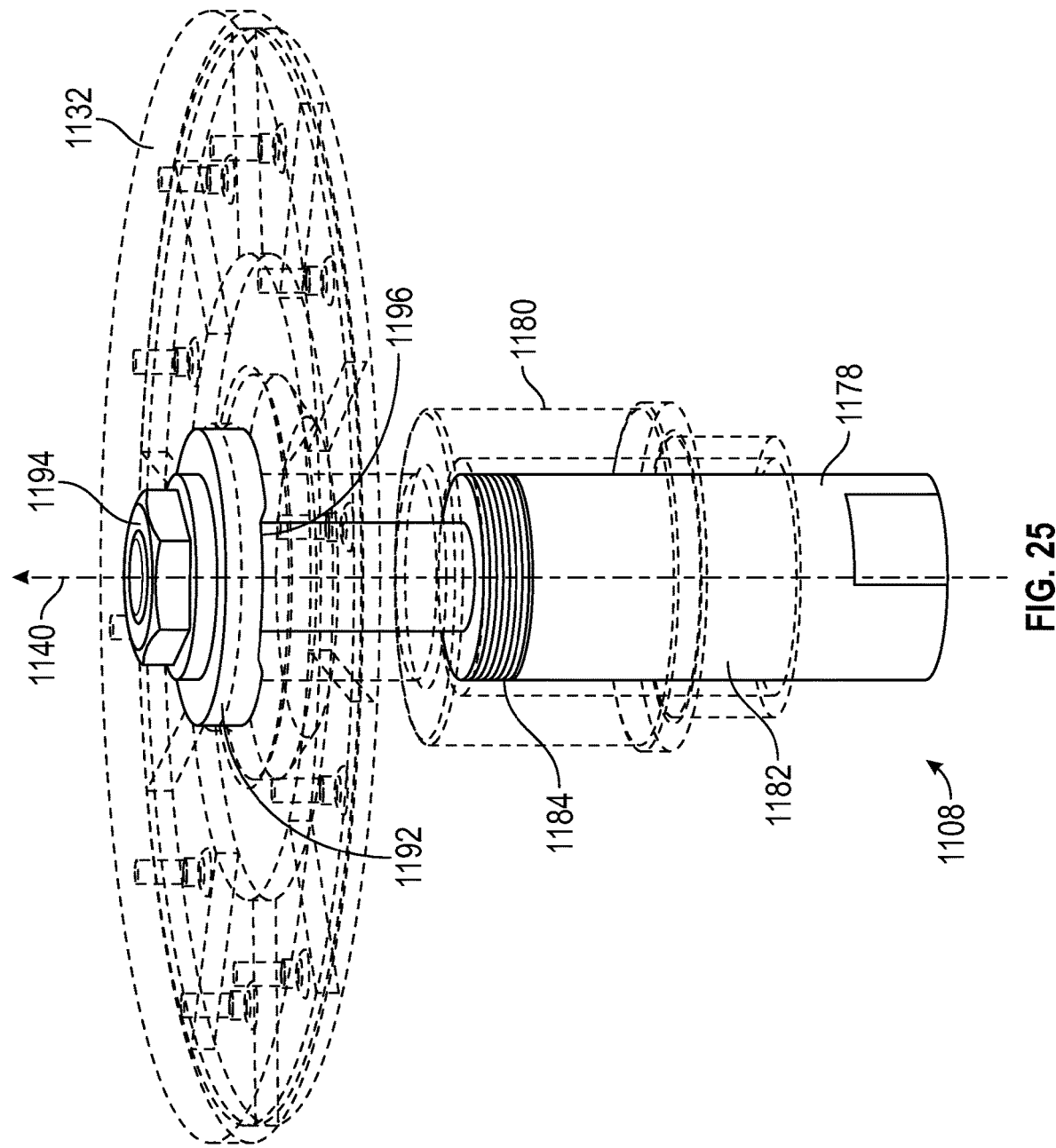
FIG. 25 is a perspective view of a shaft and rotor assembly of the chore motor of FIG. 24.

Other types of torque and axial load-limiting features can be incorporated into the chore motors 110 as well. For example, and as shown in FIGS. 24-25, a chore motor 110 for use in the lawn mower 100 is depicted. The chore motor 110 includes a motor housing 1100 similar to the motor housing 1000, and is defined by a lower housing 1102 and a motor cover 1104. The motor housing 1100 defines a wired electrical connection (not shown) that provides a supply of electrical power into the motor cavity 1114 that can be used to generate electromagnetic fields within a coil assembly 1130 that in turn rotates a rotor 1132 and a drive shaft 1108 that is coupled to the rotor 1132. The motor 110 again includes a coolant system, bearings 1134, and a shaft adjustment nut 1138.

The chore motor 110 depicted in FIGS. 24-25 includes an axial clutch system 1190 that is coupled to the drive shaft 1108. The drive shaft 1108 is once again formed of a shaft assembly 1176 that is configured to disengage from the rotor 1132 when an axial force exceeding a threshold amount is experienced by the blade. The shaft assembly 1176 once again includes a first shaft 1178 and a second shaft 1180. The first shaft 1178 is received within a cylindrical sleeve 1182 that extends within the second shaft 1180. A stack of spring washers 1184 are positioned between opposing faces of the first shaft 1178 and second shaft 1180, respectively, to bias the faces away from one another. The first shaft 1178 and second shaft 1180 are coupled to one another using a washer 1192 and a nut 1194 that together define an axial clutch. The nut 1194 is threaded onto the first shaft 1178, which compresses the washer 1192 upon each of the second shaft 1180 and the rotor 1132 to create a coupling therebetween.

The washer 1192 provides a keyed connection between the drive shaft 1108 (e.g., through the first shaft 1178) and the rotor 1132. As shown in FIG. 25, the washer includes a series of detents 1196 that interface with complimentary structures formed on the rotor 1132. Accordingly, when the detents 1196 are aligned with and mated with the complimentary structures formed on the rotor 1132, rotation of the rotor 1132 drives rotation of the shaft assembly 1176 and blade 112 through a keyed or clutch-style connection.

The axial clutch system 1190 is designed to disengage the shaft assembly 1176 from the rotor 1132 in response to impact loading. For example, if the blade 112 or first shaft 1178 contacts a rock or stump, for example, a significant axial force may be imparted on the first shaft 1178. The axial clutch system 1190 is designed to disengage the shaft assembly 1176 to remove the torque loading on the drive shaft 1108 that might otherwise cause failure. If an axial load is supplied to the first shaft 1178, the shaft will attempt to travel upward, along the shaft axis 1140 relative to each of the sleeve 1182 and the second shaft 1180. The spring washers 1184 oppose upward movement of the first shaft 1178 relative to the rotor 1132 and relative to the second shaft 1180 to keep the first shaft 1178 engaged with the rotor 1132. If the axial force imparted on the first shaft 1178 is above a threshold level, the first shaft 1178 will travel upward within the second shaft 1180, and will overcome the bias of the spring washers 1184. As the first shaft 1178 travels upward along the shaft axis 1140, the bias from the spring washers 1184 will cause the second shaft 1180 to begin traveling upward along the shaft axis 1140 as well. Upward movement of the second shaft 1180 forces the washer 1192 upward as well. As the washer 1192 travels upward, relative to the rotor 1132, the detents 1196 on the washer 1192 will disengage from the rotor 1132. With the detents 1196 disengaged, the shaft assembly 1176 is disengaged from the rotor 1132, which allows the rotor 1132 to continue rotating without driving the shaft assembly 1176 or blade 112. Accordingly, any increased torque loading experienced by shaft assembly 1176 can be quickly reduced. Similarly, once the axial force has dissipated, the spring washers 1184 will force the first shaft 1178 downward, away from the second shaft 1180 and the second shaft 1180 will travel downward as well, allowing the washer 1192 to reengage with the rotor 1132 to re-establish the coupling between the components. In some examples, the motor 110 should be shut off or otherwise disabled before re-establishing the coupling between the washer 1192 and the rotor 1132.

Various other torque and axial load-limiting features can be added into the chore motor 110 to help prevent or otherwise combat drive shaft fracturing that might be fatal in conventional motors. Referring now to FIGS. 26-33, various different mechanisms that can be incorporated into the chore motors 110 to limit torque experienced by the drive shafts of the chore motors 110 are provided. Each component allows the drive shaft to be temporarily or entirely decoupled from the rotor, which reduces the torque loading experienced by the drive shaft and can reduce the likelihood of fatal motor failure.

Figure 26:
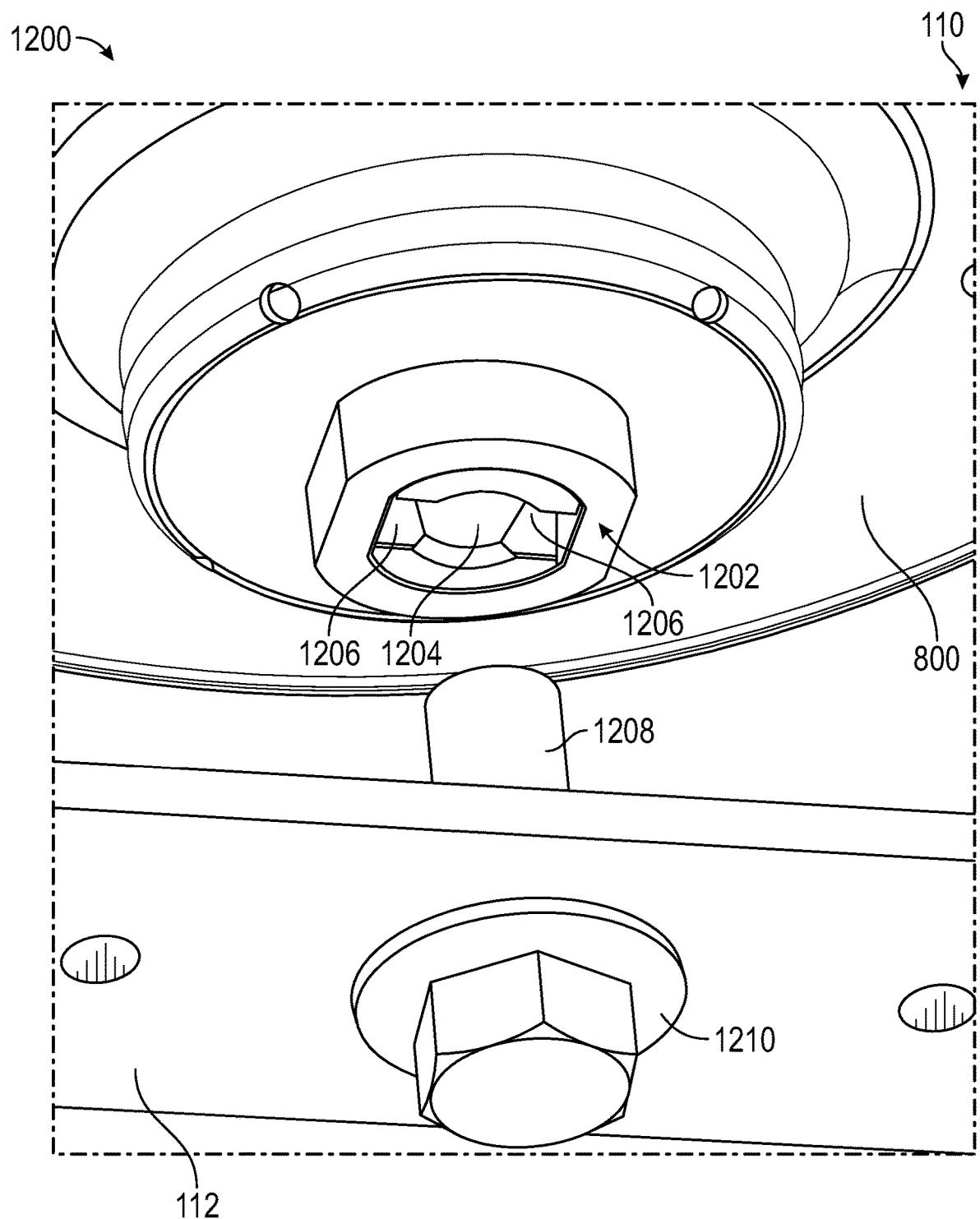
FIG. 26 is a bottom perspective view of a spindle assembly that can be incorporated into one of the chore motor of FIG. 15, 18, 20, or 24.
Figure 27:
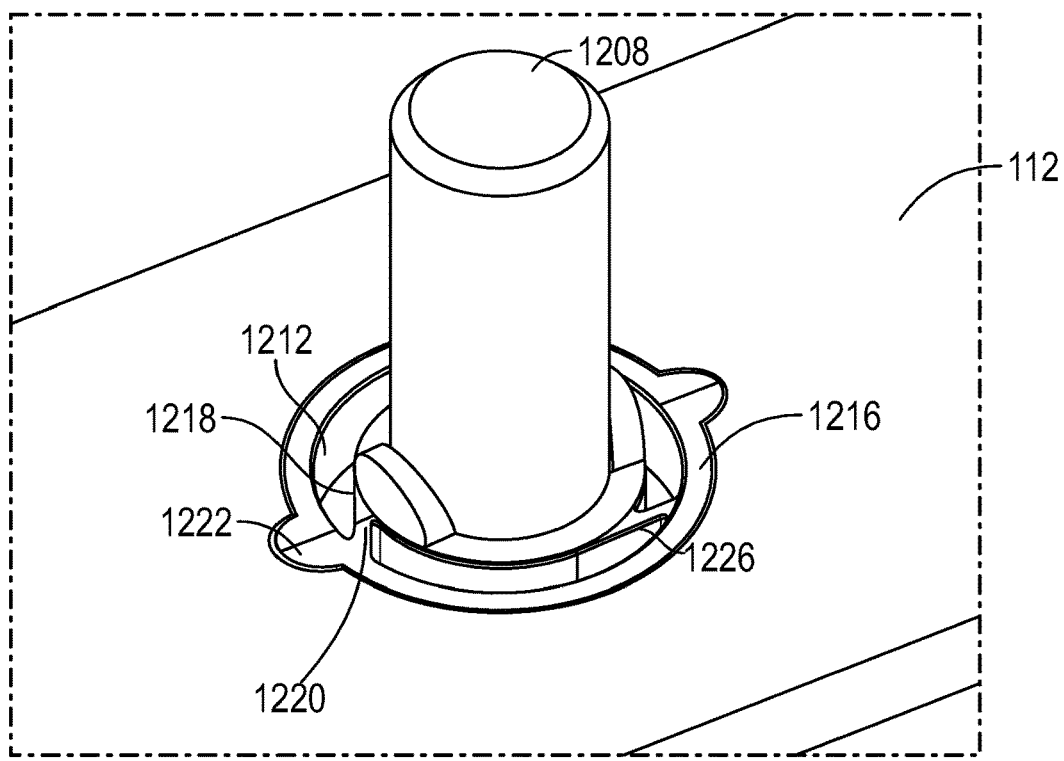
FIGS. 27-28 are perspective views of a key-style clutch that can be incorporated into the spindle assembly of FIG. 26.
Figure 28:
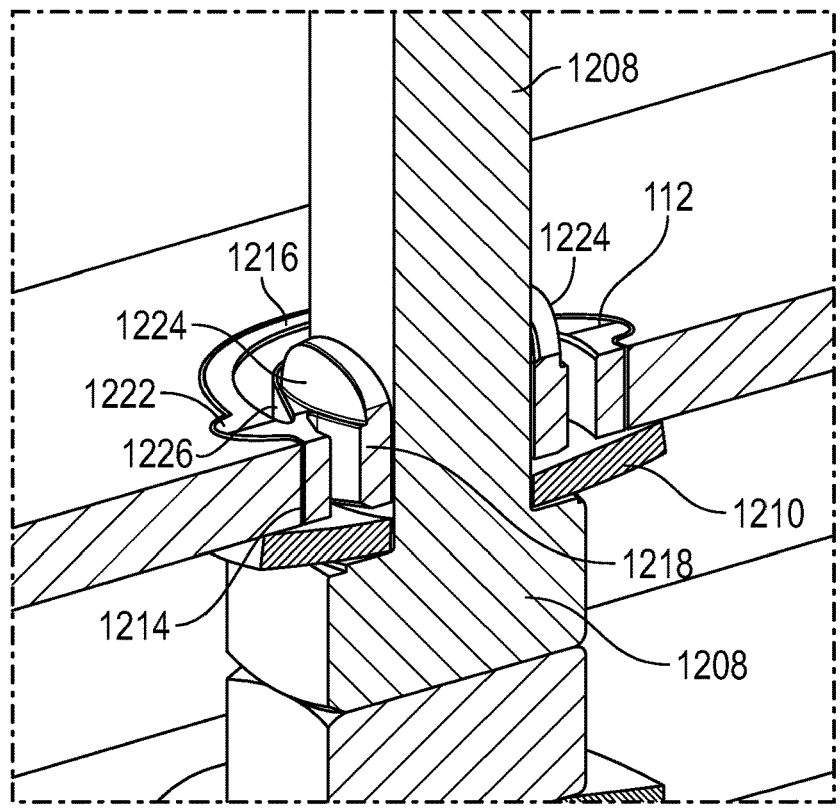

Referring first to FIGS. 26-28, a spindle assembly 1200 for a chore motor 110 is provided. The spindle assembly 1200 can be included on any of the chore motors 110 previously described, and is positioned at a bottom of the motor housing (e.g., the motor housing 800). The spindle assembly 1200 is configured to interface with the blade 112 so that the blade 112 and spindle assembly 1200 rotate in concert with the drive shaft (e.g., the drive shaft 808) and the rotor (e.g., the rotor 832). The spindle assembly 1200 generally includes a chuck 1202 that is defined by a substantially circular opening 1204. Two cylindrical grooves 1206 extend radially outward from the opening 1204. The chuck 1202 is designed to receive and secure a spindle shaft 1208 to couple the blade 112 to the spindle assembly 1200.

The spindle assembly 1200 receives and secures the blade 112 using a keyed connection. As depicted in FIGS. 27-28, the spindle shaft 1208 can receive and support a spindle washer 1210 (e.g., a Belleville washer) and a key 1212 that is configured to sit within a central hole 1214 formed through the blade 112. The key 1212 interfaces with each of the blade 112 and the chuck 1202 to transmit rotational force (e.g., torque) from the spindle assembly 1200 through the blade 112 and from the blade 112 through to the spindle assembly 1200.

The key 1212 has a generally cylindrical body that is defined by an outer annular section 1216, an inner annular section 1218, and a dedicated failure zone 1220 extending between the outer annular section 1216 and the inner annular section 1218. The outer annular section 1216 includes protrusions 1222 that extend outward to engage with notches formed within the central hole 1214 of the blade 112. The inner annular section 1218 is at least partially defined by two semi-circular spindle tabs 1224 that are configured to extend into and interface with the grooves 1206 formed within the chuck 1202. The dedicated failure zone 1220 takes the form of reduced-thickness bridges 1226 that extend tangentially away from the inner annular section 1218 toward the outer annular section 1216 of the body 1216. As depicted in FIGS. 27-28, the bridges 1226 are each defined by a cross-sectional thickness that is less than a cross-sectional thickness of the inner annular section 1218 and the outer annular section 1216 of the body.

The key 1212 is designed to fail in response to an axial impact or torque load on the blade 112 that exceeds a threshold level. For example, if the blade 112 contacts a rock or stump, the motor 110 will initially try to provide additional torque to the rotor to attempt to overcome the resistance. If the torque on the blade 112 exceeds a tolerable level, the bridges 1226 are designed to fail, so that the inner annular section 1218 is decoupled from the outer annular section 1216 and the blade 112 is no longer driven by the spindle shaft 1208 or the rotor. In a similar manner, the bridges 1226 are designed to shear in response to an axial impact above a predetermined threshold. Accordingly, the potentially fatal torque or axial loading on the drive shaft of the chore motor 110 is rapidly reduced before the drive shaft fails, which might otherwise cause irreparable motor failure. The key 1212 is readily replaceable, and can be removed and discarded after failure so that a new key 1212 can be inserted. The key 1212 is designed so that the failure zones are strong enough to withstand normal operation (e.g., for a traditional grass cutting operation) but weak enough to fail in response to impact loading that could endanger the drive shaft.

Figure 29:
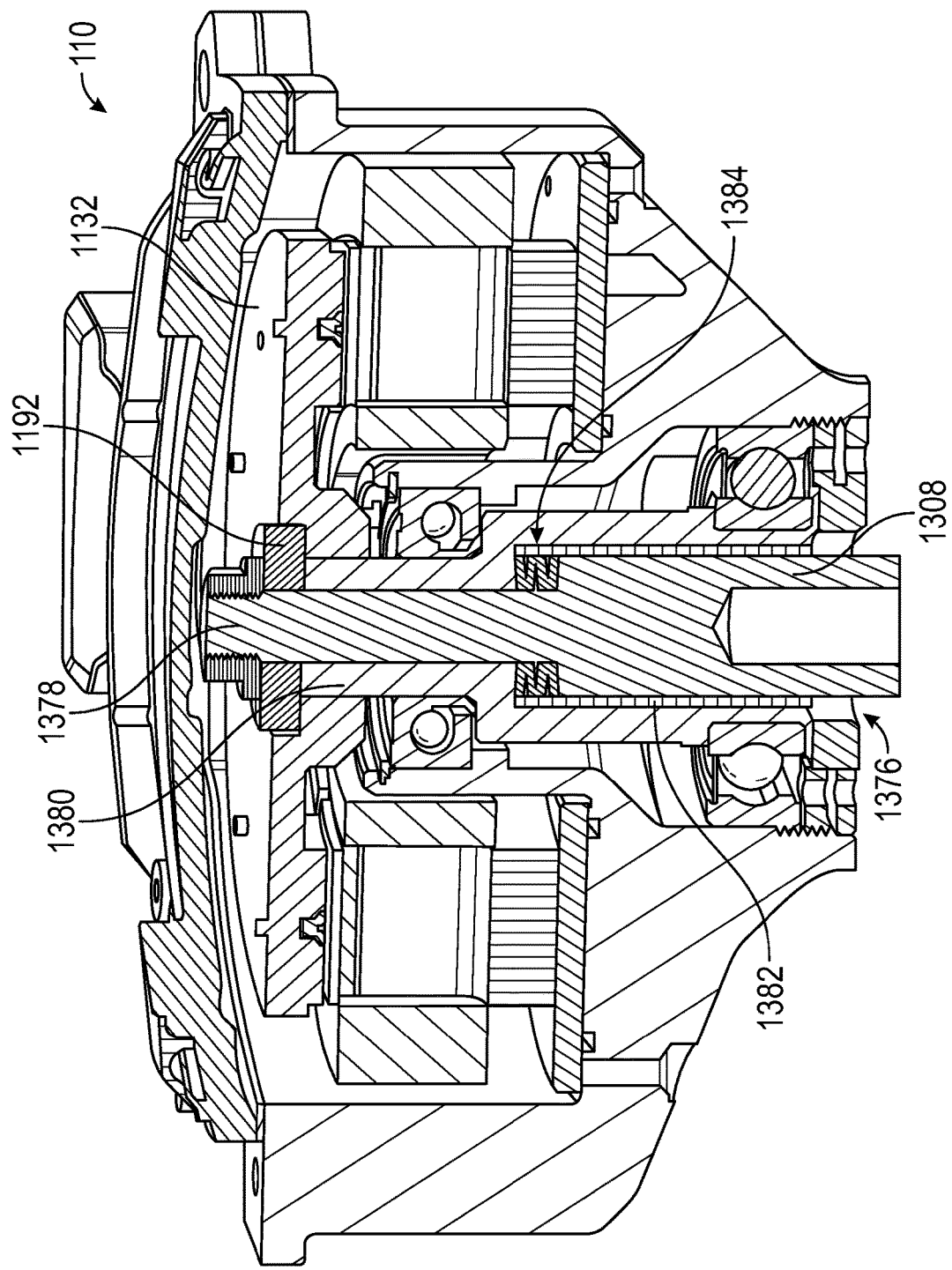
FIG. 29 is a cross-section view of another chore motor that can be incorporated into the electric stand-on mower of FIG. 1.

FIG. 29 provides another exemplary chore motor 110 that can be incorporated into the lawn mower 100 of FIG. 1. The chore motor 110 includes a similar axial clutch system to the clutch system 1190 shown and described within FIGS. 24-25. The chore motor includes a drive shaft 1308 formed of a dual-shaft assembly 1376. The dual-shaft assembly 1376 again includes an inner or first shaft 1378 that is received within and biased away from a second shaft 1380. A bushing 1382 is received within the second shaft 1380 and allows the first shaft 1378 to slide relative to the second shaft 1380. A stack of Belleville washers 1384 received positioned between the first shaft 1378 and the second shaft 1380 bias the two shafts apart from one another. A cam washer 1192 is fastened to the shaft assembly 1376 to again provide selective engagement between the rotor 1332 and the first shaft 1378. If the blade 112 experiences an impact force sufficient to overcome the engagement force of the cam washer 1192 and the Belleville washers 1384, the cam washer 1192 will be lifted out of engagement with the rotor 1378, which will cause the first shaft 1378 to stall. The stalling is designed to occur before the drive shaft 1308 fails.

Figure 30:
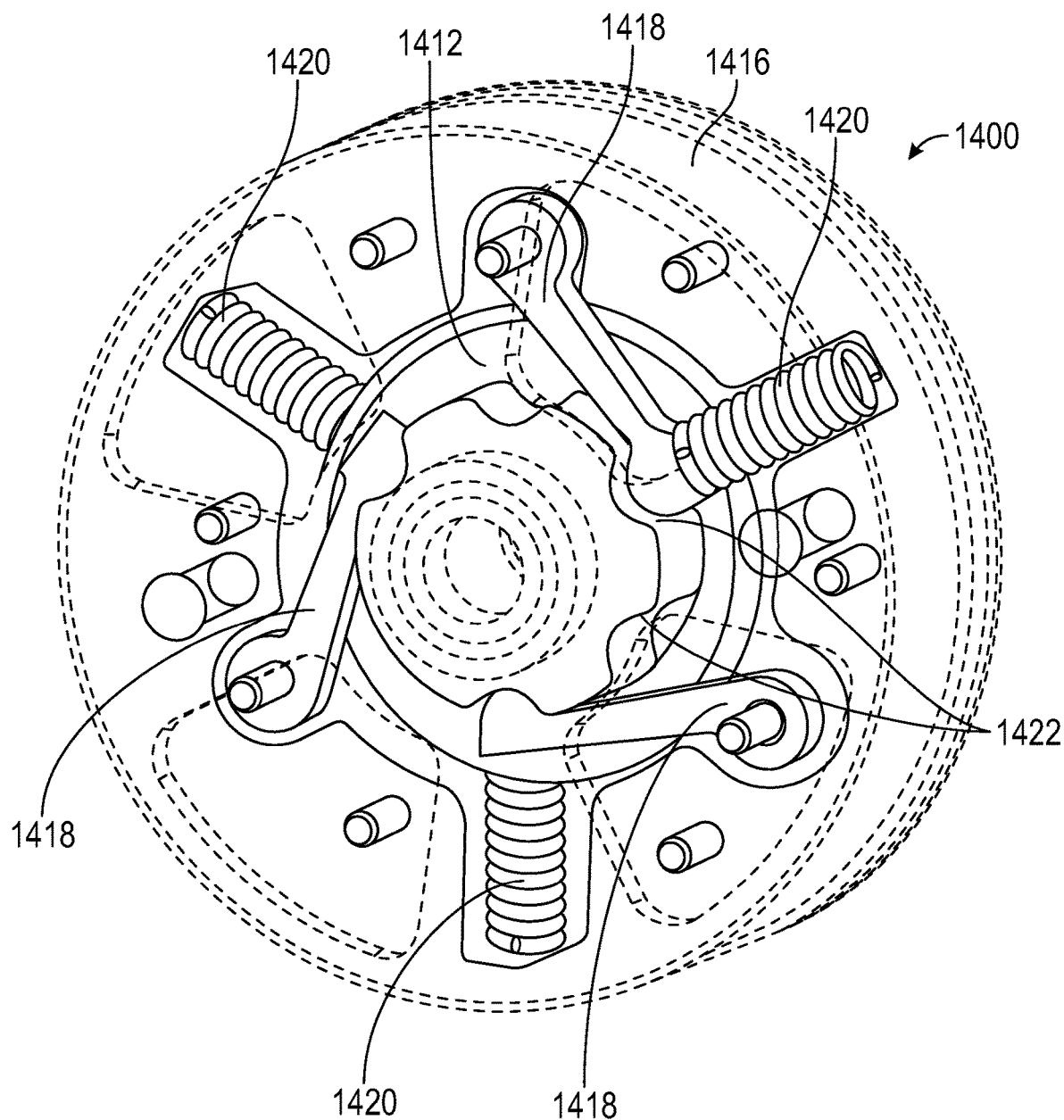
FIG. 30 is a bottom perspective view of a spindle assembly that can be incorporated into one of the chore motors of FIG. 15, 18, 20, 24, or 29.
Figure 31:
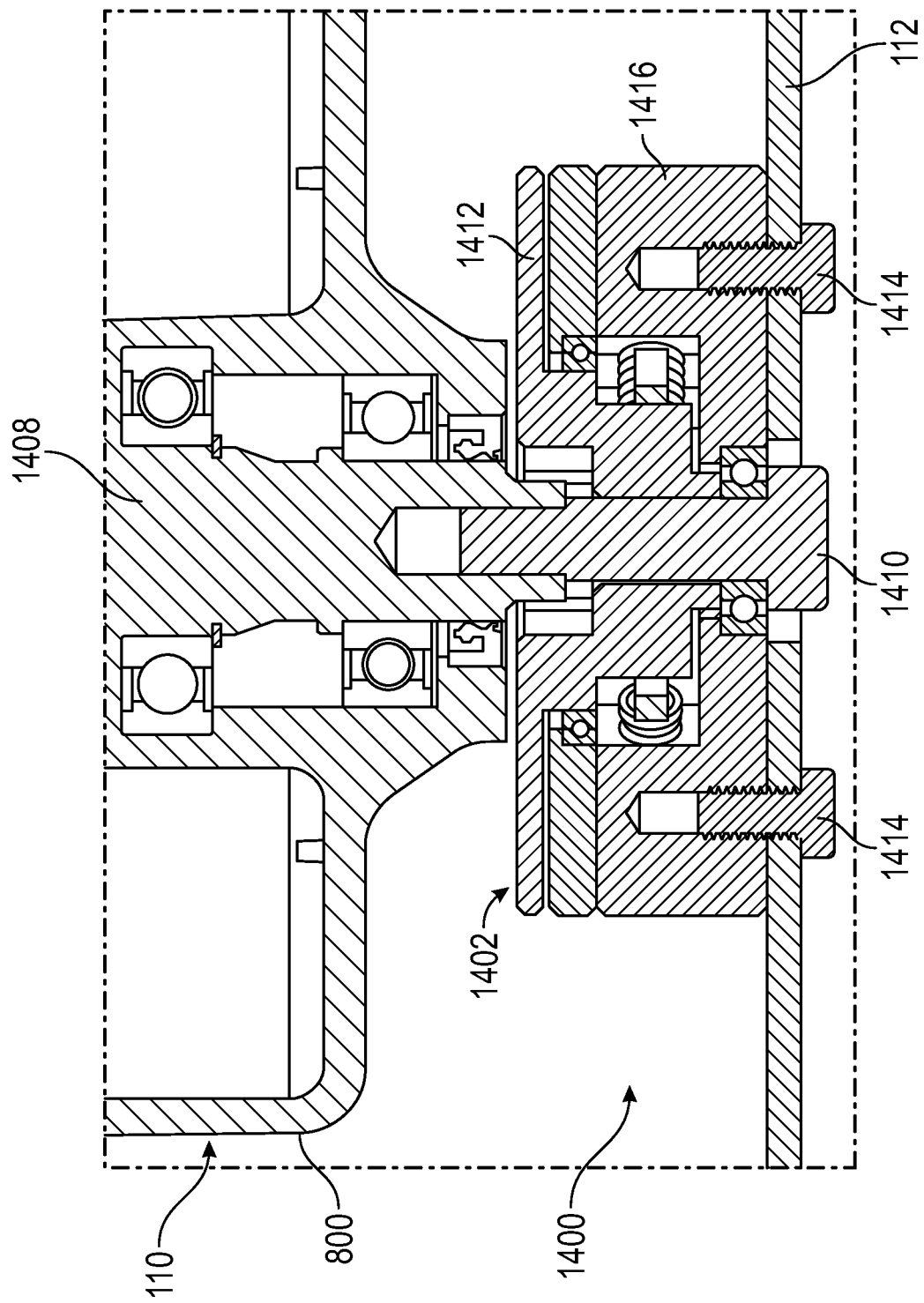
FIG. 31 is a cross-sectional view of the spindle assembly of FIG. 30, coupled to a chore motor.

FIGS. 30-31 disclose another spindle assembly 1400 that can be incorporated onto one or more of the chore motors 110 disclosed above. The spindle assembly 1400 generally includes a two-piece cylindrical body 1402 that is configured to be mounted to a drive shaft 1408 of the chore motor 110 using a center bolt 1410. The compression between the center bolt 1410 and the drive shaft 1408 supports an inner basket 1412 of the cylindrical body 1402, and allows the inner basket 1412 to rotate in concert with the drive shaft. The blade 112 can be mounted to the outer basket 1416 of the spindle assembly 1400 using bolts 1414, such that when the spindle assembly 1400 is engaged, the blade 112 rotates with the drive shaft 1408 of the motor 110.

As explained above, the spindle assembly 1400 includes a two-piece cylindrical body 1402 formed of an inner basket 1412 and an outer basket 1416 that are releasably coupled together. The outer basket 1416 and inner basket 1412 are selectively coupled together using a series of spring-loaded follower arms 1418 that serve as a clutch mechanism to selectively transmit torque from the drive shaft 1408 through the inner basket 1412 to the outer basket 1416. The follower arms 1418 are rotatably coupled to the outer basket 1416 and biased inward, toward the inner basket 1412 by compression springs 1420. The compression springs 1420 urge the distal ends of each follower arm 1418 radially inward, into contact with the inner basket 1412 so that the follower arms 1418 engage the inner basket 1412. As depicted in FIG. 30, the follower arms 1418 each include a circular distal end that is configured to interface with semi-circular detents 1422 formed within the inner basket 1412.

The compression springs 1420 can be chosen to set a specified torque limit for the motor 110. When the blade 112 comes into contact with an object that resists the rotation of the blade 112 (e.g., a rock or stump, etc.), the motor 110 begins to experience torque. As the motor 110 attempts to overcome the torque to continue rotating at its preferred or specified target speed (as set by the motor controller 115, for example), the torque on the blade 112 is transmitted through the blade 112 to the outer basket 1416 via the bolts 1414. If the torque on the blade 112 and outer basket 1416 rises above the spring force provided by the compression springs 1420, the detents 1422 will urge the follower arms 1418 radially outward, out of engagement with the detents 1422. With the follower arms 1418 disengaged from the detents 1422, the inner basket 1412 can then rotate independent of the outer basket 1416, which will be temporarily stalled. Accordingly, the torque on the drive shaft 1408 will be relieved, at least temporarily, by the disengagement of the spindle assembly 1400. Once the torque has returned to an acceptable level, the bias of the compression springs 1420 will urge the follower arms radially inward, back into engagement with the detents so that the two-piece spindle assembly 1400, blade 112, and drive shaft 1408 rotate together again.

Figure 32:
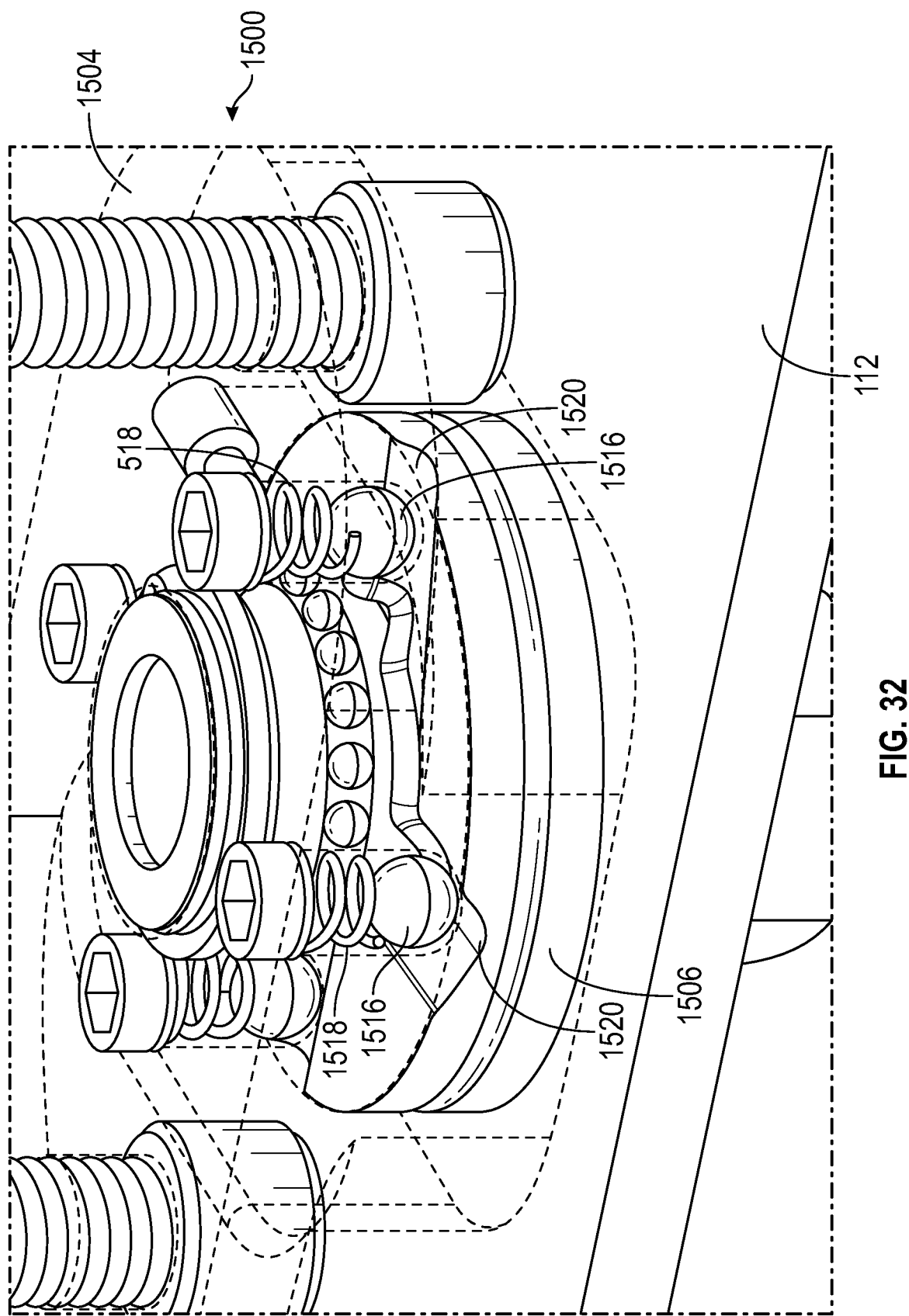
FIG. 32 is a top perspective view of another spindle assembly that can be incorporated into one of the chore motors of FIG. 15, 18, 20, 24, or 29.

FIGS. 32-33 depict a similar spindle assembly 1500 that can be incorporated onto one or more of the chore motors 110 described above. The spindle assembly 1500 generally includes a three-piece body assembly formed of a top plate 1504, a bottom plate 1506, and an adaptor plate 1510 are configured to be secured to the lower housing of a chore motor 110. The adaptor plate 1510 includes a central hole 1512 and two mounting holes 1514 positioned on either side of the central hole 1512. The central hole 1512 can receive a fastener (e.g., a bolt) that secures the adaptor plate 1510 to the chore motor 110. The mounting holes 1514 receive bolts to secure the top plate 1504 to the adaptor plate 1510. The blade 112 is mounted to the bottom plate 1506.

The top plate 1504 and bottom plate 1506 create a clutch assembly that can selectively decouple the blade 112 from the drive shaft 1508 of the chore motor 110. The clutch assembly includes a series of ball bearings 1516 that are urged downward by compression springs 1518, into engagement with detents 1520 formed within the bottom plate 1506. When the ball bearings 1516 are received within the detents 1520, torque can be transmitted from the top plate 1504 through the ball bearings 1516 to the bottom plate 1506, so that the blade 112 will rotate.

If the blade 112 is subjected to a torque (e.g., by a stump or rock, etc.), the motor 110 will attempt to overcome the obstacle to reach its desired steady state parameters. If the amount of torque generated overcomes a predetermined threshold (as determined by the springs 1518 and the angles of the detents 1520), the compression springs 1518 will compress and the ball bearings 1516 will travel upward, out of the detents 1520. With the ball bearings 1516 disconnected, the transmission between the top plate 1504 and bottom plate 1506 is interrupted, and the blade can at least temporarily be disconnected from the drive shaft 1508, which reduces the torque experienced by the drive shaft 1508 in a way that may reduce the likelihood of failure. The spring-loaded nature of the spindle assembly 1500 is such that the top plate 1504 and the bottom plate 1506 will naturally re-align with one another and the ball bearings 1516 will re-position within the detents naturally once the torque condition has been alleviated.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accompli shed with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. The term "sub-flush" refers to a surface or a component being at least partially below a certain surface of another component. It should be noted that the orientation of various elements may differ according to other exemplary embodiments, and that such variations are intended to be encompassed by the present disclosure.

The construction and arrangement of the lawn mower as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A lawn mower comprising:
a chassis supporting a plurality of wheels;
a cutting deck supported by the chassis, the cutting deck defining a cutting chamber;
a chore motor electrically coupled to a battery, the chore motor including a housing containing a coil assembly, a rotor, and a drive shaft extending out of the housing, the chore motor attached to the cutting deck so that at least a portion of the housing and the drive shaft are positioned in the cutting chamber; and
a blade coupled to the drive shaft and configured to rotate within the cutting chamber when the chore motor rotates the rotor and drive shaft,
wherein the chore motor is in communication with a motor controller, the chore motor includes a wired connection extending between the chore motor and the motor controller, the motor controller configured to adjust a flow of electrical power between the battery and the chore motor to adjust an operating parameter of the chore motor,
wherein the motor controller is configured to alternate a direction of rotation of the rotor, drive shaft, and blade by adjusting the flow of electrical power between the battery and the chore motor.

2. The lawn mower of claim 1, wherein the motor controller is positioned adjacent the cutting deck and outside the housing.

3. The lawn mower of claim 1, wherein the drive shaft is selectively coupled to the rotor, and wherein the drive shaft decouples from the rotor in response to an impact force on the blade exceeding a mechanical threshold force.

4. The lawn mower of claim 3, wherein the mechanical threshold force is at least partially determined by one of a compression spring or a spring washer.

5. The lawn mower of claim 1, wherein the drive shaft is selectively coupled to the rotor, and wherein the drive shaft decouples from the rotor in response to a torque on the blade exceeding a mechanical threshold torque value, wherein when the drive shaft is decoupled from the rotor, the drive shaft rotates relative to the blade.

6. The lawn mower of claim 5, wherein the drive shaft is a shaft assembly including a first shaft, a connecting shaft received within a cavity in the first shaft, and a second shaft received within the connecting shaft, wherein the first shaft, the connecting shaft, and the second shaft are coupled to the rotor and configured to rotate about a shared axis in a first operating condition.

7. The lawn mower of claim 6, wherein the second shaft is configured to rotate within the connecting shaft, relative to the first shaft, in a second operating condition, wherein the second operating condition occurs in response to the torque on the blade exceeding a threshold value.

8. The lawn mower of claim 1, further comprising a spindle assembly positioned within the cutting chamber, the spindle assembly being coupled to the drive shaft, wherein the spindle assembly supports the blade and is configured to selectively transmit torque from the drive shaft to the blade.

9. The lawn mower of claim 8, wherein the spindle assembly is coupled to the blade with a key, and wherein the key includes a failure zone configured to fail in response to one or more of an axial impact and a torque experienced by the blade, and wherein failure within the failure zone allows relative rotation between the blade and the spindle assembly.

10. The lawn mower of claim 1, wherein the housing of the chore motor is defined by a lower housing and a motor cover removably coupled to the lower housing, wherein at least eighty-percent of the lower housing extends below the cutting deck.

11. The lawn mower of claim 10, wherein the lower housing is mounted to the cutting deck with flanges and extends entirely below the cutting deck such that only the motor cover extends above a top surface of the cutting deck.

12. A lawn mower comprising:
a chassis supporting a plurality of wheels;
a cutting deck supported by the chassis, the cutting deck defining a cutting chamber;
a chore motor electrically coupled to a battery, the chore motor including a housing containing a coil assembly, a rotor, and a drive shaft extending out of the housing, the chore motor attached to the cutting deck so that at least a portion of the drive shaft is positioned in the cutting chamber; and
a blade coupled to the drive shaft and configured to rotate within the cutting chamber when the chore motor rotates the rotor and drive shaft;
wherein relative rotation between the blade and the drive shaft occurs in response to a torque on the blade exceeding a threshold value.

13. The lawn mower of claim 12, wherein the relative rotation between the blade and the drive shaft occurs by relative rotation between the drive shaft and a driven shaft, the driven shaft being coupled to the drive shaft and supporting the blade.

14. The lawn mower of claim 12, further comprising a spindle assembly coupled to the drive shaft and supporting the blade, wherein the spindle assembly includes a clutch that selectively disengages the blade from the drive shaft to allow relative rotation between the blade and the drive shaft.

15. The lawn mower of claim 12, wherein the housing supports a shaft adjustment nut, the shaft adjustment nut being movable along a shaft axis to adjust a position of the rotor relative to the coil assembly.

16. A lawn mower comprising:
a chassis supporting a plurality of wheels;
a cutting deck supported by the chassis, the cutting deck defining a cutting chamber;
a chore motor electrically coupled to a battery, the chore motor including a housing containing a coil assembly, a rotor, and a drive shaft extending out of the housing, the chore motor attached to the cutting deck so that at least a portion of the drive shaft is positioned in the cutting chamber; and
a blade coupled to the drive shaft and configured to rotate within the cutting chamber when the chore motor rotates the rotor and drive shaft;
wherein relative rotation between the blade and the drive shaft occurs in response to an axial force on the blade exceeding a threshold value.

17. The lawn mower of claim 16, wherein the drive shaft includes a cam washer biased into engagement with the rotor, and wherein the washer disengages the rotor in response to axial movement of the drive shaft relative to the rotor.

18. The lawn mower of claim 16, wherein the blade is secured to the drive shaft using a clamping stud that is removably received within the drive shaft and configured to translate axially, along a shaft axis in response to movement of a handle.

19. A lawn mower comprising:
a chassis supporting a plurality of wheels;
a cutting deck supported by the chassis, the cutting deck defining a cutting chamber;
a chore motor electrically coupled to a battery, the chore motor including a housing containing a coil assembly, a rotor, and a drive shaft extending out of the housing, the chore motor attached to the cutting deck so that at least a portion of the housing and the drive shaft are positioned in the cutting chamber; and
a blade coupled to the drive shaft and configured to rotate within the cutting chamber when the chore motor rotates the rotor and drive shaft,
wherein the drive shaft is selectively coupled to the rotor, and wherein the drive shaft decouples from the rotor in response to an impact force on the blade exceeding a mechanical threshold force.

20. A lawn mower comprising:
a chassis supporting a plurality of wheels;
a cutting deck supported by the chassis, the cutting deck defining a cutting chamber;
a chore motor electrically coupled to a battery, the chore motor including a housing containing a coil assembly, a rotor, and a drive shaft extending out of the housing, the chore motor attached to the cutting deck so that at least a portion of the housing and the drive shaft are positioned in the cutting chamber; and
a blade coupled to the drive shaft and configured to rotate within the cutting chamber when the chore motor rotates the rotor and drive shaft,
wherein the drive shaft is selectively coupled to the rotor, and wherein the drive shaft decouples from the rotor in response to a torque on the blade exceeding a mechanical threshold torque value, wherein when the drive shaft is decoupled from the rotor, the drive shaft rotates relative to the blade.

* * * * *